United States Patent [19]

Knickel

[11] 4,224,596

[45] Sep. 23, 1980

[54] OBJECT LOCATOR SYSTEM EMPLOYING VARIABLE FREQUENCY CODE TONE GENERATORS

[76] Inventor: Elwyn R. Knickel, 2647 Woodley Rd. NW., Washington, D.C. 20008

[21] Appl. No.: 560,811

[22] Filed: Mar. 21, 1975

[51] Int. Cl.[2] ........................ G08G 1/12; H04M 11/00; G01P 3/48

[52] U.S. Cl. .................................. 340/24; 179/2 DP; 324/167; 340/32; 364/460

[58] Field of Search ........................ 340/24, 32, 23, 62, 340/263, 52 R, 53, 171 PF, 350, 351; 179/2 DP; 343/112 PT; 325/6, 47, 55; 235/150.26, 150.27, 30 R; 324/167; 364/444, 449, 460

[56] References Cited

U.S. PATENT DOCUMENTS

| | | | |
|---|---|---|---|
| 2,529,667 | 11/1950 | Villem | 325/51 |
| 3,376,509 | 4/1968 | Willcox et al. | 325/57 |
| 3,419,865 | 12/1968 | Chisholm | 340/24 |
| 3,568,161 | 3/1971 | Knickel | 340/24 |
| 3,582,895 | 6/1971 | Abramson | 340/171 PF |
| 3,715,572 | 2/1973 | Bennett | 340/52 |
| 3,719,890 | 3/1973 | Borciani et al. | 179/2 DP |
| 3,783,384 | 1/1974 | Wycoff | 325/55 |
| 3,789,198 | 1/1974 | Henson | 340/24 |
| 3,866,124 | 2/1975 | Wycoff | 325/55 |
| 3,984,807 | 10/1976 | Haemming | 340/23 |

*Primary Examiner*—John W. Caldwell, Sr.
*Assistant Examiner*—James J. Groody
*Attorney, Agent, or Firm*—Ira C. Edell

[57] ABSTRACT

Improvements are provided for a vehicle locator system of the type in which vehicle-borne emitters radiate coded tone combinations for reception by spaced sensors which are linked to a central decoding office. In one improvement the vehicle capacity of the system is increased without increasing the number of tone oscillators by using a sequential tone coding arrangement wherein each oscillator is switchable to provide a different tone during different intervals in the coding sequence. In addition, the pulsing rate of the emitted tone is synchronized to the vehicle odometer to assure that a code sequence is transmitted while the vehicle is in the proximity of each sensor station. Additional modifications include party line sharing of telephone lines connecting the sensors to the decoder, the use of long-distance telephone connections to provide coverage for large geographie regions, the use of radio call boxes to link the sensors to a decoding station, and delaying emitter pulsing when two vehicles are in close proximity to reduce the possibility of simultaneous reception of two vehicle codes at a sensor station.

22 Claims, 13 Drawing Figures

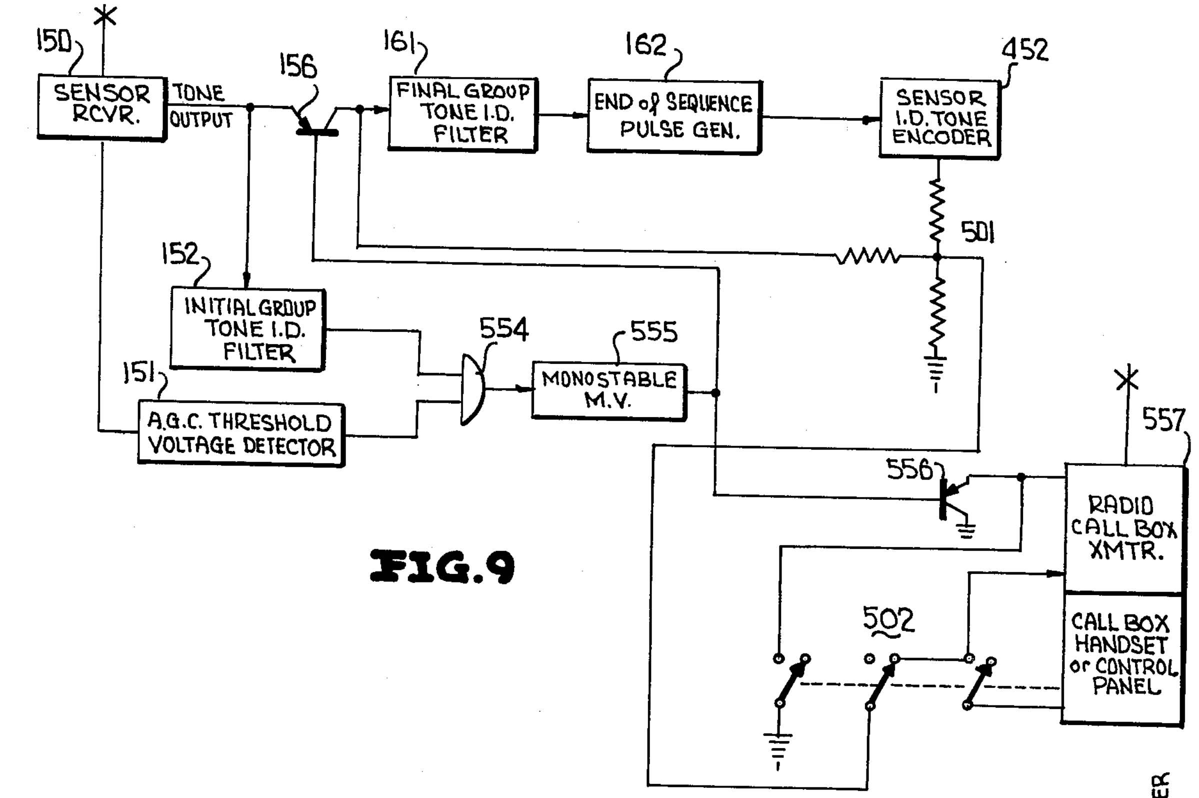
FIG. 9
FIG. 11
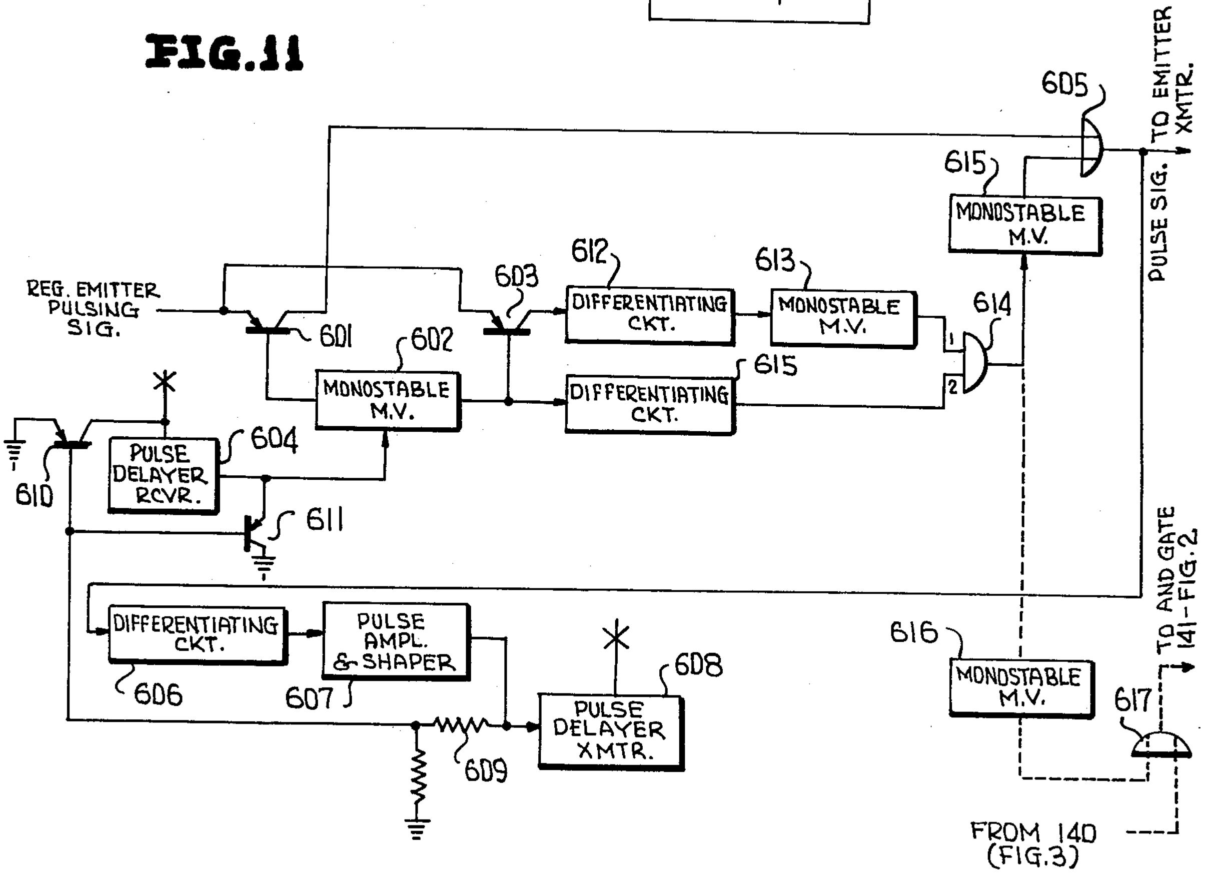

OBJECT LOCATOR SYSTEM EMPLOYING VARIABLE FREQUENCY CODE TONE GENERATORS

BACKGROUND OF THE INVENTION

The present invention relates to systems for locating vehicles travelling within a prescribed area or over a prescribed route, and particularly to such systems wherein road side sensors receive emitted signals from vehicles and transmit the signals to a central decoding station. The invention as described herein is an improvement over the system described in my prior U.S. Pat. No. 3,568,161 which is incorporated herein by reference.

The system described in my prior patent employs a coded emitter located in each vehicle and provides street-side sensors installed at pre-selected locations within an area or region being monitored. The emitter is a very low power RF transmitter which continuously radiates a signal modulated by audio coding tones which identify the vehicle and/or its status. The signal is demodulated at the sensor and automatically transmitted to a terminal center by telephone lines or the like. Processing at the center permits display or other type readout of the location of each vehicle since the particular vehicle code has been received at a particular sensor location. Vehicle location is updated each time the vehicle passes a sensor. The number of vehicles which can be unambiguously identified in such a system depends on the number of coding tones utilized in each identification code. It is of course possible to increase the vehicle capacity of the system by using a sequence of coding intervals wherein different combinations of coding oscillators are gated on or not during each coding interval. The problem with this approach, however, is that failure of a coding oscillator can provide an erroneous identification signal, resulting in the anomaly of the same vehicle showing up at the two locations within the monitored region. The anomaly may be avoided by using a parity oscillator which is gated on or not during each coding interval to assure that an even (in the case of even parity) or odd (in the case of odd parity) number of coding tones are gated on at any time. However, it is desirable to avoid the expense of an additional parity oscillator. In fact, it is desirable to minimize the number of oscillators required overall so that the cost of the system can be minimized.

It is therefore an object of the present invention to provide a coding arrangement in the system of the type described wherein the number of coding oscillators, and therefore the system expense, is kept to a minimum.

It is another object of the present invention to provide a coding sequence in a vehicle locator system of the type described wherein the number of oscillators is kept to a minimum and wherein the sequence is repeated sufficiently often to assure that a complete coding sequence is received by each sensor station passed by the vehicle.

It is another object of the present invention to provide a party line arrangement in the connections between the sensor stations and the central office to thereby minimize the cost of the system.

It is another object of the present invention to adapt the system of the type described to large geographic regions by utilizing long distance telephone interconnections between the sensor stations and the central processing office.

It is another object of the present invention to employ radio links between call boxes and decoding stations in a vehicle locator system.

It is still another object of the present invention to provide an arrangement in a vehicle locator system of the type described wherein transmission of a vehicle coding signal is delayed when two vehicles are in close proximity so that confusion is minimized at the decoder.

SUMMARY OF THE INVENTION

In accordance with the present invention, the vehicle capacity of a vehicle locator system is increased by employing a plural interval coding sequence and by arranging each coding tone oscillator to generate more than one tone. In this manner any oscillator can provide different tones during different intervals in the sequence, thereby minimizing the number of oscillators required to provide the various tone combinations. The repetition rate of the pulse modulated transmitted tones is synchronized to the vehicle odometer to assure that a complete coding sequence is transmitted while the vehicle is within the receiving range of a sensor station.

In order to permit vehicle location in regions encompassing more than one local telephone office, long distance telephone lines and automatic dial up connections are employed.

To maximize efficient utilization of telephone lines, a party line system is employed wherein the locator system shares telephone lines with other telephone system users.

Other features are disclosed, such as: the use of radio links between sensor stations and a central office (in place of telephone lines); delayed from one or more vehicle emitters which are proximate the same sensor station to avoid garbling of two or more simultaneously received codes; and adaptation of the system for use in predestrian (rather than vehicle) location.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 9 is a schematic diagram of a sensor station modified to transmit information to a decoder station via a radio link;

FIG. 11 is a schematic diagram of a circuit employed in conjunction with vehicle or pedestrian emitters to prevent two such emitters from transmitting codes simultaneously;

DESCRIPTION OF THE PREFERRED EMBODIMENTS

Figure 1:
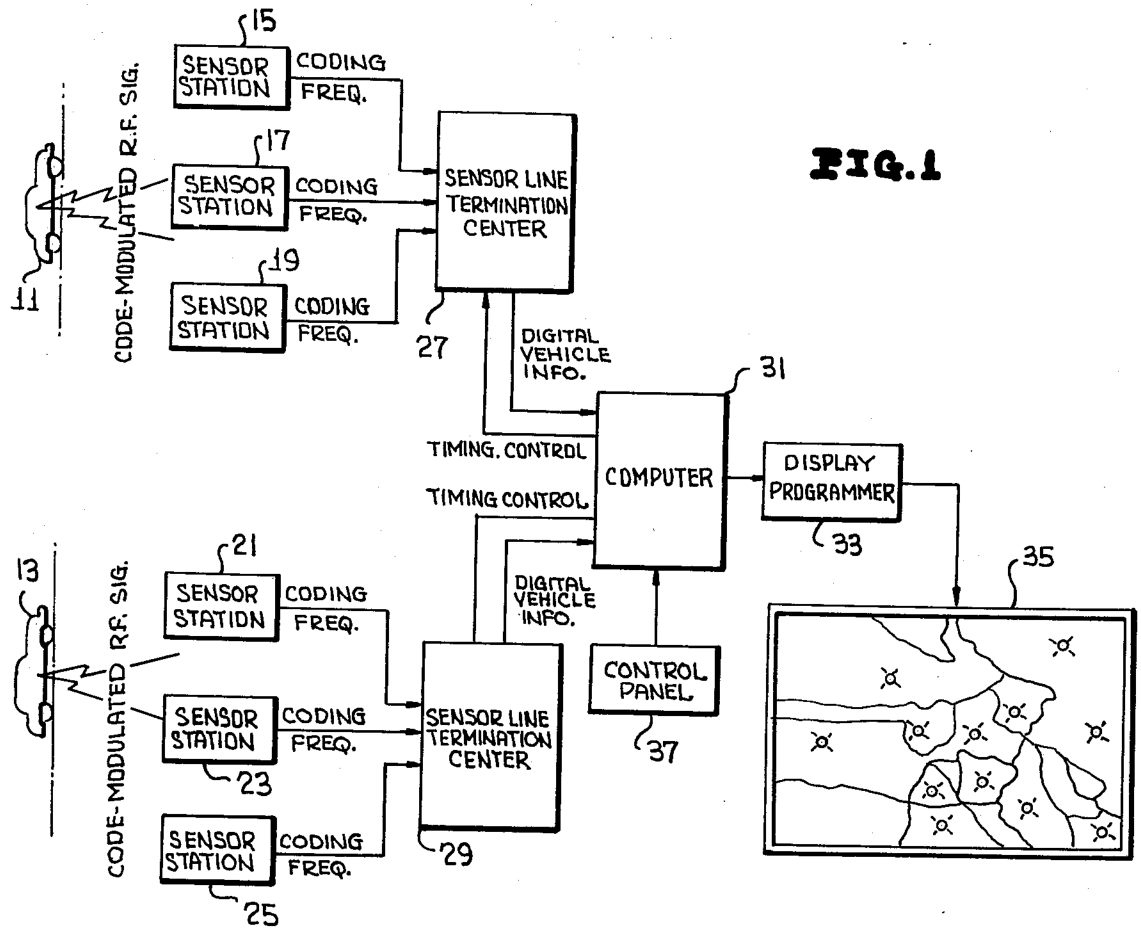
FIG. 1 is a functional block diagram of the overall system in which the improvements of the present invention are employed.

Referring now specifically to FIG. 1 of the accompanying drawings, two vehicles 11 and 13 are illustrated as representing a fleet of vehicles (i.e., police cars, buses, taxi cabs, trucks, trains, etc.) whose locations are to be monitored. Each vehicle carries a coded emitter which transmits an RF carrier signal which is modulated by audio frequency coding tones. The emitter, which may be of the type described in my aforementioned U.S. Pat. No. 3,568,161, is a very low power transmitter designed to provide a signal with a limited range, on the order of 100 feet or less. Such transmitters can be operated without an FCC license on many frequencies, and because of their limited range do not contribute to the problem of spectrum congestion.

Multiple sensor stations, exemplified by sensor stations 15, 17, 19, 21, 23 and 25, are disposed at preselected locations within a prescribed area through which vehicles 11 and 13 are to travel. For example, in the case of police cars, the sensor stations may comprise police call boxes located within the various beats or sectors to be patroled by the fleet of patrol cars. Similarly, fire call boxes, traffic control boxes or other public installations may be utilized as sensor stations, or in the alternative, special sensor station installations may be provided. In the case of buses, the street-side sensor stations would be spaced along the prescribed bus routes, and in the case of taxi cabs the sensor stations would be disposed at preselected locations in the area within which the taxi company's franchised to operate. For trains, the sensor stations would be disposed at various intervals along the track, and for trucks the sensor stations would be located at specific points along the prescribed truck route. As vehicle 11 passes the location of sensor 17, its coded signal is received by a suitable receiver unit located in sensor station 17. The low power signals received by the sensor station are demodulated to recover the audio frequency of coding tones which are then automatically transmitted to sensor line termination centers 27 and 29. Termination center 27 is illustrated as receiving the coding frequency signals from sensor stations 15, 17 and 19, whereas sensor line termination center 29 is illustrated as receiving the coding frequency signals from sensor stations 21, 23 and 25. The number of sensor line termination centers provided, as well as the number of sensor stations feeding an individual termination center, depends upon the deployment of sensor stations in any given system. It is conceivable, for example, that all of the sensor line termination centers and the equipment located therein may be merged into a signal unit located at a central control installation which may or may not be at the same location as the dispatcher. In the case of a police patrol car locator system, the police call boxes are often connected by telephone lines to the various police precinct houses located throughout the city. Accordingly, the present system, when used to locate police cars, contemplates utilization of these telephone lines in transmitting the coded frequencies from the call box sensor stations to sensor line termination centers located within the precinct houses. In some cases, it may be possible to use the telephone lines in conjunction with carrier-derived circuits which can be superimposed on existing physical circuits such as fire and police cables without impairing the existing service. The carrier or radio frequency technique is widely used in the field of telephony, radio and power line telemetry and control. In the field of telephony, a significant portion of all trunk and subscriber circuits are carrier derived without impairment of the physical services and at a cost well below that which would result from the utilization of additional physical circuitry.

At sensor line termination centers 27 and 29, the coding frequency signals are sequentially scanned and decoded to provide information indicating that a particular vehicle has passed the sensor station being scanned. The decoded information is then fed to a computer 31. Each time a vehicle passes a sensor the decoded signal updates a vehicle location memory file in the computer. The computer in turn drives a display programmer 33 which correlates computer information applied thereto so that appropriate lamps on display map 35 are illuminated. Each of the lamps on map 35 corresponds to a sensor station location and is illuminated in response to the sensing of a vehicle at the respective sensor station. Other vehicle data, for example passager loading on a bus, may also be displayed. By means of a control panel 37 the dispatching officer can interrogate the computer to determine the identity of a vehicle known to be at a given location, or conversely to determine the last reported sensor station location of a particular vehicle at any time.

Figure 2:
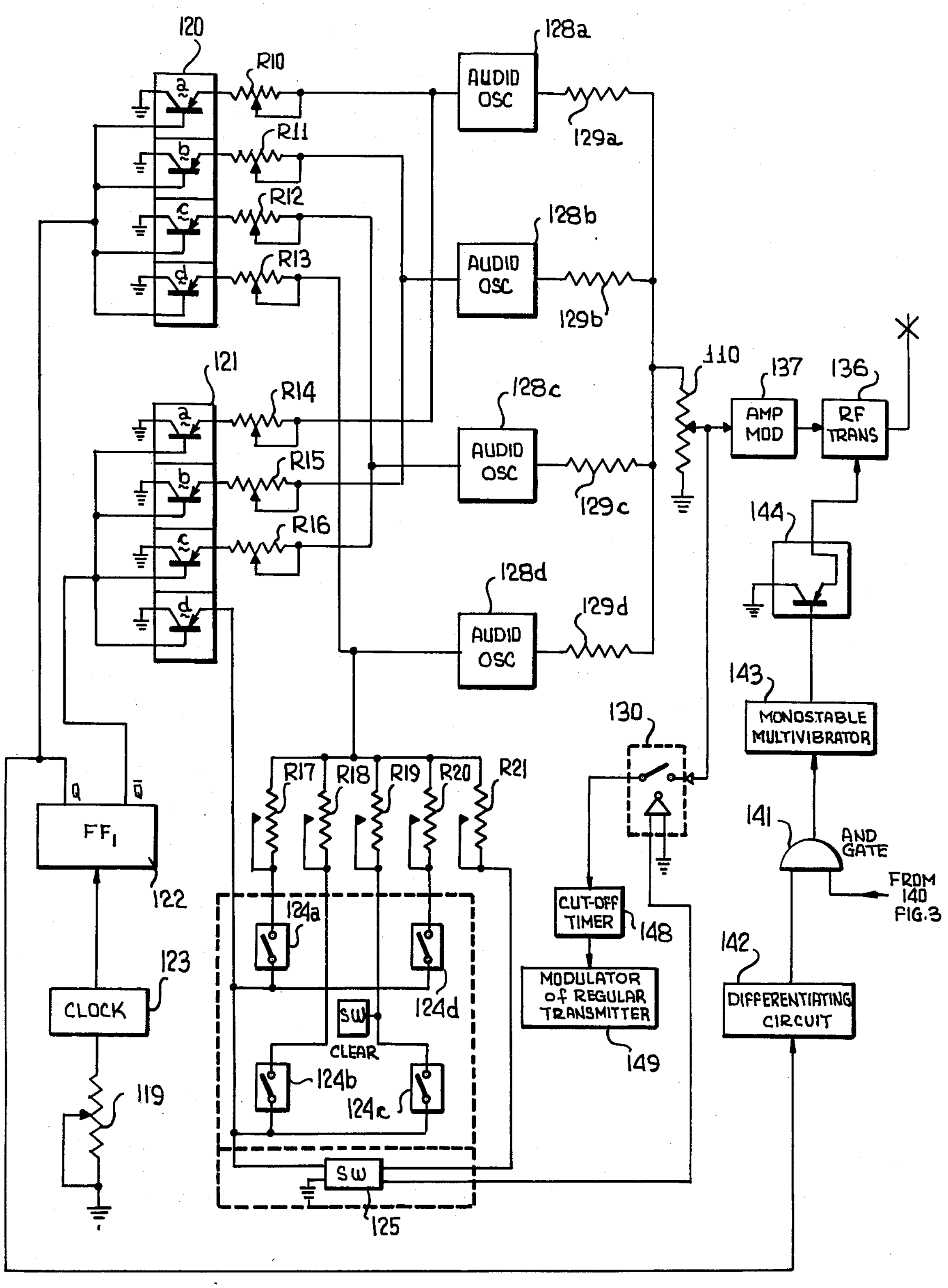
FIG. 2 is a schematic diagram of a vehicle emitter of the present invention.

Referring now to FIG. 2 of the accompanying drawings, there is illustrated a schematic diagram of a typical vehicle emitter device which is carried by all vehicles (11, 13) in a fleet of vehicles whose locations are being monitored by the system of the present invention. The ultimate emitted signal is transmitted by a low power radio frequency transmitting device 136 which, for example, may be essentially the same type of device as that which is found in conventional radio-controlled garage door opening systems. An example of a suitable transmitter is illustrated and described in my aforementioned U.S. Pat. No. 3,568,161. An amplitude modulator 137 is utilized to amplitude modulate the RF signal generated within transmitter 136. Each vehicle emitter circuit includes a plurality of audio oscillators which serve as sources for coding tones. In the particular embodiment illustrated in FIG. 2, four oscillators **128*a*, 128*b*, 128*c* and 128*d* are illustrated; however, it is to be understood that fewer or more oscillators may be utilized, depending upon the coding requirements in a particular system. The oscillators are preferably plug-in type oscillators, each having a different nominal frequency. In addition, each oscillator is rendered operative (i.e. oscillatory) only when a return path is completed to ground through a variable resistor (R10 through R20) and transistor switch (120, 121, 124, 125). The oscillation frequency is determined by the setting on the variable resistor through which the oscillator is returned to ground. More specifically, oscillator 128***a* is returned to ground through either the series combination of variable resistor R10 and transistor switch 120*a* or the series combination of variable resistor R14 and transistor switch 121*a*. If R10 and R14 are set to provide different series resistances, oscillator 128*a* oscillates at a different frequency when switch 120*a* is closed than when switch 121*a* is closed. Likewise audio oscillator 128*b* is returned to ground through resistor R11 and switch 121*b* or through resistor R15 and transistor switch 121*b*. Audio oscillator 128*c* is returned to ground through resistor R12 and switch 120*c* or resistor R16 and switch 121*c*. Oscillator 128*d* is returned to ground through resistor R13 and switch 120*d* or through one or more of resistors R17 through R21 and their appropriate status switches 124*a*, 124*b*, 124*c*, 124*d*, 125, the combination in series with switch 121*d*.

A primary clock source 123 provides a train of master timing pulses at a repetition rate which is determined by the setting of a timing adjustment potentiometer 119. The clock source pulses are applied to a bistable multivibrator 122 which simply alternates between its Q and $\overline{Q}$ states upon receiving successive pulses from the clock source. The Q output signal from multivibrator 122 is applied to the base electrodes in each of switches 120*a* through 120*d*. The $\overline{Q}$ signal from multivibrator 122 is applied to the base electrodes of each of switches 121*a* through 121*d*. In this manner, each of switches 120*a* through 120*d* are activated simultaneously and in alternation with each of switches 121*a* through 121*d* which are also actuated simultaneously. The Q output signal from multivibrator 122 is also applied to a differentiating circuit 142 for purposes to be described subsequently.

Whereas the coding arrangement described in my aforementioned U.S. Pat. No. 3,568,161 employs continuous modulation of the RF signal with identification tones, the present invention utilizes a sequence of two or more coding intervals wherein the modulating tones may differ in each interval. More specifically, clock source 123 determines the rate at which flip-flop 122 alternates between its Q and $\overline{Q}$ states. When the flip-flop is in its Q state, transistors 120*a* through 120*d* are actuated and tone control resistors R10 through R13 determine the frequencies of oscillators 128*a* through 128*d*. When flip-flop 122 is switched to its $\overline{Q}$ state, transistors 121*a* through 121*d* are actuated and resistors R14 through R16 determine the operating frequencies of oscillators 128*a* through 128*c*. In addition, resistors R17 through R21 determine the frequency of audio oscillator 128*d* during this second coding interval. In the exemplary embodiment illustrated in FIG. 2, switches 124*a* through 124*d* are operator-actuated switched which represent a particular status condition in the vehicle, such as passager loading in the case of a bus, on-call condition in the case of a taxi cab, etc. and permit respective resistors R17 through R20 to determine the frequency of audio oscillator 128*d* in accordance with the vehicle status. An emergency switch 125 permits resistor R21 to determine the frequency of oscillator 128*d* when actuated during an emergency condition for the vehicle. Resistors R17 through R21 have a cumulative effect in determining the frequency of oscillator 128*d*. More particularly, if more than one of switches 124*a* through 124*d* and 125 are actuated at one time when switch 121*d* is closed, it is the combined parallel resistance of the corresponding resistors in series with the active switches which determines the frequency of oscillator 128*d*. For example, if switches 124*a* and 124*b* are closed when switch 121*d* is closed, it is the combined parallel effect of resistors R17 and R18 which determines the frequency of oscillator 128*d*. In this regard, it is important that resistors R17 through R21 be selected so that all possible combinations of these resistors produce a unique parallel resistance and thereby a unique frequency for oscillator 128*d*.

Resistors R11 through R16, in the example of FIG. 2, determine the tones which identify the vehicle. In other words, the tones produced by audio oscillators 128*b*, 128*c* and 128*d* during the first coding interval and the tones produced by oscillators 128*a*, 128*b*, 128*c* during the second coding interval combine to uniquely identify the particular vehicle from which these tones originate. On the other hand, the tone controlled by resistor R10 is the same for all vehicles and is utilized to identify the first coding interval in a coding sequence. In this manner the decoding circuitry can properly synchronize its operation to the start of a coding sequence.

In a preferred although not necessarily required feature of the present invention, the oscillators in each vehicle are the same. This feature permits a significant cost reduction in a multi-vehicle system by virtue of the fact that advantage can be taken of the low cost characteristics of large volume production and/or purchases.

The output signals from oscillators 128*a* through 128*d* are passed through respective amplitude adjustment potentiometers 129*a* through 129*d* and are summed at summing potentiometer 110 from which point the tones are applied to amplitude modulator 137.

As mentioned above, one tone during the first interval of a coding sequence is common to all vehicle emitters so that the first interval in the sequence can be identified by the decoding circuitry. It is also possible to utilize a second common tone to identify the second coding interval, or a third common tone to identify a third coding interval, or two common tones may be utilized to identify the first and last coding intervals respectively. In general, the tones may be selected to suit the requirements of the system. For example, the status coding tones may be split so that one selected tone is actuated by a transistor and transistor bank 120 so that it is transmitted with the first group of tones, and a second selected status tone is actuated by a transistor in transistor bank 121 so that it would be transmitted with the second group of tones. If three groups of tones are used, the first two groups might be utilized for vehicle identification and the third for vehicle status, or if four groups of tones are used the first two might be used for vehicle identification and the last two for vehicle status, etc. In any case, an important feature of the present invention, and one which is applicable no matter how many coding intervals are employed, is the fact that the same oscillators are capable of providing different frequencies during different coding intervals depending upon the particular resistor connected in its ground return path during that interval.

As noted from FIG. 2, the differentiating circuit 142 converts the leading edge of the Q output signal from flip-flop 122 to a voltage spike which is applied to AND gate 141. The other input signal to this AND gate is derived from the vehicle odometer-controlled emitter pulser described below in reference to FIG. 3. The output signal from the AND gate is applied to a monostable multivibrator 143 which provides a pulse of fixed duration each time AND gate 141 is actuated. This fixed duration pulse is applied to the base of transmitter enabler transistor 44 to actuate the RF transmitter 136 during the period of monostable multivibrator 143. This portion of the circuit pulses the RF transmitter at a rate determined by the distance travelled by the vehicle, which is equivalent to having the pulsing rate of the transmitter controlled directly by the rate of speed of the vehicle. This is important because the vehicle must send its signal out frequently enough so that the vehicle cannot pass by a road side sensor without having transmitted its signal within the receiving range of the sensor. If the emitter and sensor antennas have an omnidirectional antenna pattern so that the maximum emitter-to-sensor range is a constant of X feet in all directions, then the vehicle emitter must theoretically pulse at least once every time the vehicle traverses 2X-ST feet, where S is the speed of the vehicle in feet per second and T is the duration of the emitter coding sequence. In the example described in reference to FIG. 2, T is equal to the time required to transmit the two coding intervals, or, more precisely, twice the repetition frequency of clock 123. In practice, however, since antenna patterns would most likely not be exactly omnidirectional, and in order to account for other system variables, the vehicle emitter should be pulsed more frequently than once every 2X-ST feet. If the "dual look" feature of my U.S. Pat. No. 3,568,161 is employed, then the emitter would be pulsed twice as frequently.

As the speed of the vehicle increases, the time required for the vehicle to traverse 2X-ST feet decreases so that the rate of the emitter pulsing must increase accordingly. At very high speeds the pulsing rate may increase to a point where the pulses run together, in which case the emitter continuously pulses. The main object of having the emitter pulsing controlled as a function of the distance traversed by the vehicle is to limit the number of transmissions by the vehicle emitter to only the number which is required for the system to operate reliably. In this way, the probability of vehicle emitters interferring with each other is kept to a minimum.

Figure 3:
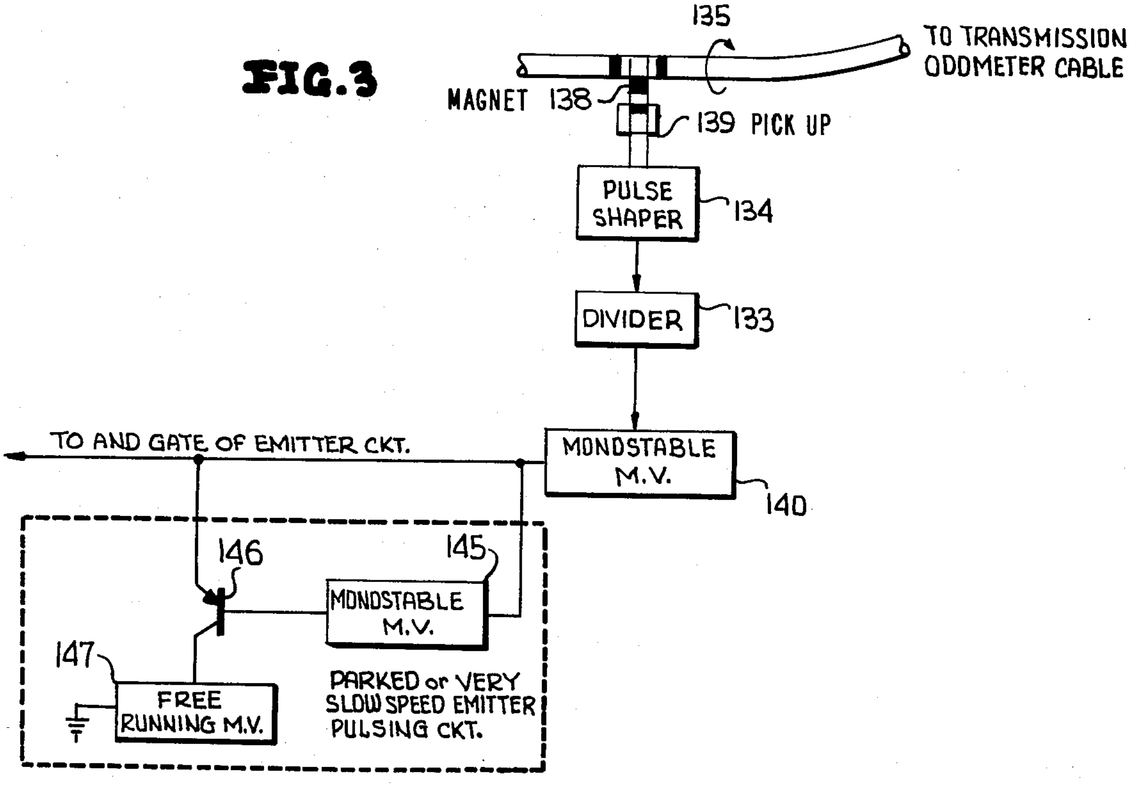
FIG. 3 is a schematic diagram of a circuit for controlling a vehicle emitter pulse repetition rate in response to the vehicle odometer.

There are a variety of techniques which may be employed to control pulsing of the emitter as a function of the distance traversed by the vehicle. By way of example, one such technique is illustrated in FIG. 3 of the accompanying drawings. Specifically, a small magnet 138 is attached to the vehicle odometer cable 135. Each time the odometer cable completes one rotation, magnet 138 rotates past a pick-up coil 139, thereby causing the field of the magnet to be cut by the pick-up coil and causing a voltage pulse to be induced in the coil. The resulting pulse is amplified and squared by pulse shaper 134 and fed to a pulse frequency divider 133. The rate of the induced pulses is counted down by the dividers so that one pulse, or in some cases more, is generated for every X feet travelled by the vehicle. The use of divider 133 assumes that the odometer cable 135 completes several rotations during the time the vehicle is travelling the desired distance between the emitter pulses. It is conceivable that the odometer cable might rotate only once while travelling this distance in which case no divider is required. It is also conceivable that the odometer might rotate less than once while the vehicle is travelling the desired distance between the emitter pulses; in this case, the odometer cable would have two or more magnets matched thereto. It may also be desirable, consistent with the "dual look" feature of the system described in my U.S. Pat. No. 3,568,161, to provide two pulses from divider 133 for every X feet travelled by the vehicle. This would permit the emitter signals from successive pulses to be compared for error detection purposes by the method described in relation to the "dual look" feature of the referenced patent.

The output pulses from divider 133 are fed to a monostable multivibrator 140 which, when triggered remains in its unstable state for a period of approximately the period of bistable multivibrator 122 of FIG. 2. At high vehicle speeds, when monostable multivibrator 140 is triggered at a high rate, it very well may remain permanently in its unstable state. The output from monostable multivibrator 140 is delivered to AND gate 141 of FIG. 2 along with the voltage spike representing the leading edge of the Q output pulse from bistable multivibrator 122. When AND gate 141 is actuated its output signal causes monostable multivibrator 143 to flip to its unstable state, where it remains for a period equal to or slightly shorter than the period of multivibrator 122. If monostable multivibrator 140 remains continuously in its unstable state at high vehicle speeds then monostable multivibrator 143 receives a trigger pulse from the differentiating circuit 142 through AND gate 141 every time flip-flop 122 flips into the Q state. This causes monostable multivibrator 143 to also remain continuously in its unstable state.

This circuitry thus described permits pulsing of the vehicle emitter to be controlled as a function of the distance traversed by the vehicle. In addition pulsing is timed to begin simultaneously with the activating of the first tone group, since the leading edge of the Q signal from flip-flop 122 actuates the first tone group at switch bank 120 and actuates AND gate 141 through differentiating circuit 142. The pulsing rate of the vehicle emitter increases as the vehicle speed increases and may pulse continuously at high rates of vehicle speed. However, the circuitry as thus far described, prevents all transmission as long as the vehicle is in a stopped condition. It may be desirable to avoid this condition and assure that the vehicle emitter never pulses slower than some minimum pulse rate. This feature is embodied by elements 145, 146 and 147 of FIG. 3. Specifically, for purposes of explanation it is assumed that the minimum desired emitter pulsing rate is once every thirty seconds. In this case, monostable multivibrator 145 is designed to remain in its unstable state for a period of thirty seconds after being triggered by monostable multivibrator 140. Multivibrator 145 remains constantly in its unstable state so long as it is triggered at least once every thirty seconds. When multivibrator 145 does not receive a triggering pulse for thirty seconds or more, it flips to its stable state causing transistor switch 146 to close whereby pulses from free running multivibrator 147 are applied through switch 146 to AND gate 141 in FIG. 2. The period of free running multivibrator 147 is thirty seconds and the duty cycle is such as to assure that bistable multivibrator 122 cycles at least once during each logic 1 condition in the pulse train provided by multivibrator 147. This condition, whereby the pulses from multivibrator 147 are applied to AND gate 141, continues until a voltage pulse is generated by magnetic pick-up coil 139, at which time monostable multivibrator 145 is triggered to its unstable state and deactivates switch 146. The operation of the system then reverts to its normal mode until the vehicle again slows to a point where magnetic pick-up coil 139 receives pulses less frequently than once in thirty seconds.

The emergency status switch 125 is actuated in the manner described in my above-referenced U.S. Pat. No. 3,568,161 at column 6, lines 10 through 69. As illustrated in FIG. 2 herein, actuation of the emergency status switch 125 actuates electronic audio switch 130 to deliver the multi-tone modulation coding signals from summing potentiometer 110 to the modulator 149 of the regular two-way radio unit in the vehicle. A cut-off timer 148 is operable in response to actuation of the electronic audio switch 130 to define a timing interval during which the multitone coding signals are permitted to modulate the regular two-way transmission. In addition, the multi-tone signals, during an emergency situation, are transmitted by the transmit-only circuitry including amplitude modulator 137 and RF transmitter 136.

Figure 4:
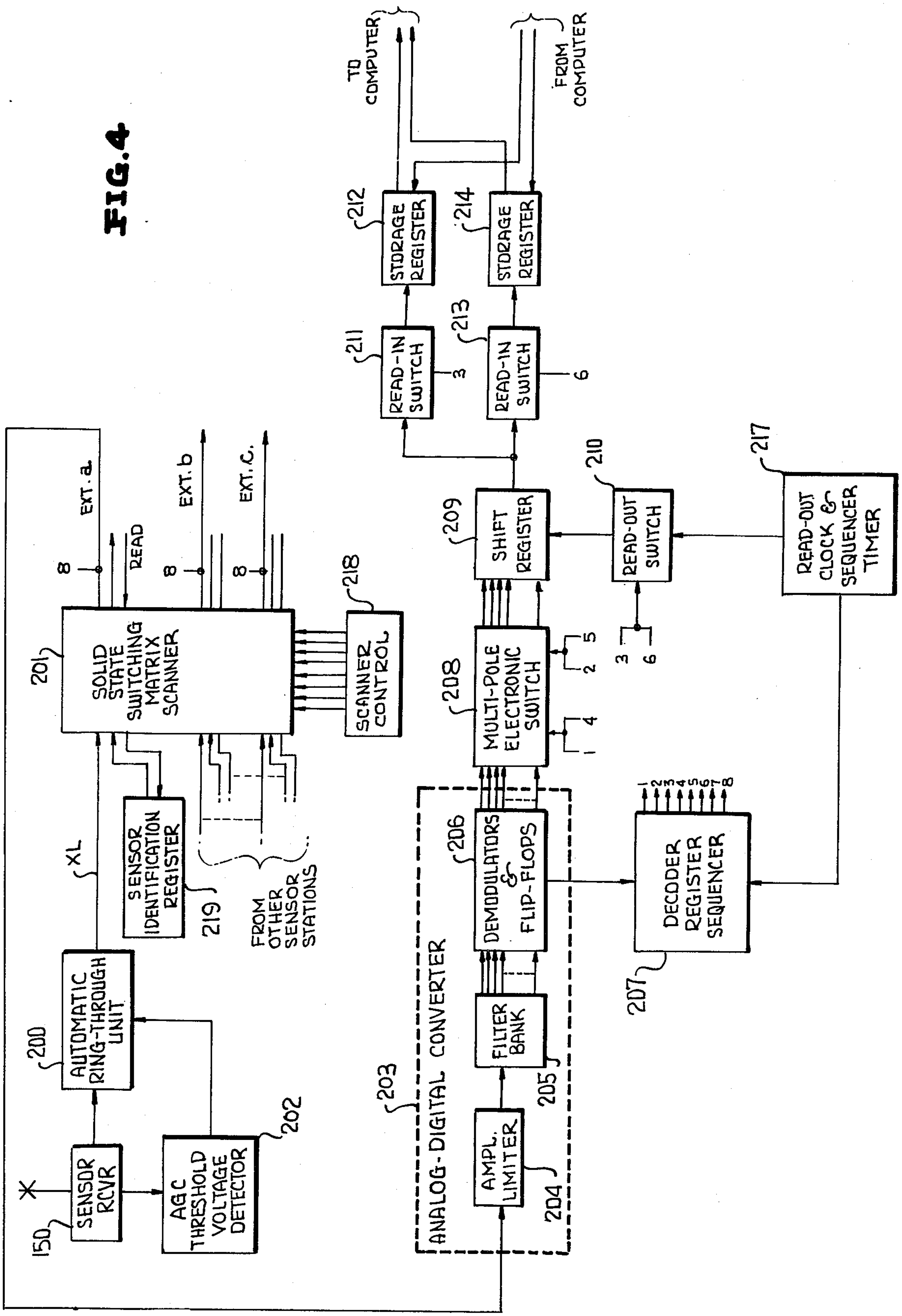
FIG. 4 is a schematic diagram of sensor and decoder circuits which are interconnected by dedicated telephone lines.

Referring specifically to FIG. 4 of the accompanying drawings, equipment located at a sensor station includes a sensor receiver 150, an automatic ring-through unit 200, and an AGC threshold detector 202. Typically the sensor station would be a police call box or other similar road side installation connected to decoding circuitry at some central location by means of a dedicated telephone line XL, there being one telephone line per sensor station. Sensor receiver 150 functions in a conventional manner to demodulate coding tones appearing on the received RF carrier signal. These demodulated coding tones are transmitted on line XL to the decoding circuit through the automatic ring-through unit 200. The automatic ring-through unit maintains the connection between the sensor receiver 150 and the telephone XL in an "on-hook" condition until a signal is received by the sensor receiver; this prevents noise burst or weak interference signals from being transmitted to the decoder and providing erroneous information. The automatic ring-through unit 200 is held in the "on-hook" condition by the AGC threshold voltage detector 202 until a signal of proper level is received by receiver 150. When a sufficiently strong signal is received, the AGC threshold voltage detector 202 places the automatic ring-through unit 200 in its "off-hook" condition, and the demodulated tone signals from the sensor receiver are transmitted over telephone line XL.

When the automatic ring-through unit 200 at any sensor station places its corresponding telephone line XL in an "off-hook" condition, an automatic ring-through signal is sent to switching matrix scanner 201. Scanner 201 continuously scans all incoming sensor station lines for the presence of a ring-through signal. Sequential scanning of the sensor station lines is controlled by a scanner control unit 218 which operates in a conventional manner to sequentially activate different input lines to the scanner 201. When a ring-through signal from a sensor station is detected during scan, scanner 201 connects the active sensor station line to an available extension line a, b, c, etc. The number of extension lines a, b, c, etc. is significantly smaller than the number of incoming telephone lines XL so that a relatively small number of decoder circuits serve a relatively large number of sensor stations having dedicated telephone line XL. As is the usual practice with conventional telephone systems, a sufficient number of extension lines a, b, c, etc. are provided so that there is a very low probability of all such extension lines being busy when a call from a sensor station is detected. If all extension lines are in fact busy when a ring-through signal is detected, the vehicle identification and location data being transmitted on that sensor line is lost. The number of decoder extensions a, b, c, etc. which are required to service a given number of sensor lines XL is determined primarily by the number of emitter-equipped vehicles in the system, the transmission range of the emitters, the pulse duration of the emitters, and the pulse rate of the emitters. For typical police vehicle locator systems, three decoder extension lines are capable of serving several hundred sensor lines. This is true because in order for a sensor signal to be blocked by a busy signal, at least four vehicles would have to be within range of sensors at the same time, and all four vehicle emitters would have to be pulsing simultaneously. Even with several hundred police vehicles there is a low probability of this occurring.

Each of the output extension lines from scanner 201 is connected to an independent decoder circuit. Each decode circuit includes an analog-to-digital converter 203 which is substantially identical to the analog-to-digital converter 93 described in my aforementioned U.S. Pat. No. 3,568,161. Converter 203 includes an amplifier limiter 204, a filter bank 205 and demodulators and flip-flops 206. The amplifier limiter 204 receives signals passed on the extension a line from scanner 201. The limiter serves to accentuate differences in levels between components of a multifrequency signal. Filter bank 205 contains a set of filters, each of which is designed to pass only a respective one of the code frequency tones being utilized. The filter bank thus contains one filter section for every one of the possible identification tones plus all of the possible vehicle status and emergency tones. The output signals from filter bank 205 are fed to demodulator and flip-flop unit 206. More specifically, each filter section from filter bank 205 feeds a respective detector-demodulator, the latter providing a signal only in response to passage of a code tone through its associated filter section. The detector-demodulator output signal drives a respective flip-flop which is stable in one state (i.e. off) in the absence of an input signal and stable in its other state (i.e. on) in the presence of input signal.

A decoder register sequencer 207 is a conventional sequencer unit which when actuated operates to sequentially activate each of its eight output lines. The actuation signal for decoder register sequencer 207 is derived from the demodulators and flip-flop unit 206. More particularly, there is at least one tone which identifies the initial group of tones in the vehicle emitter sequence. When that particular tone is detected by its corresponding flip-flop in unit 206, that flip-flop provides an actuating signal for the decoder register sequencer 207. Upon commencement of sequencing at sequencer 207, output line 1 is the first line to be activated. Activation of line 1 results in closure of the multipole electronic switch 208, permitting the binary code present in the flip-flops in unit 206 to be transferred to shift register 209. That is, corresponding flip-flops in unit 206 are permitted during step one of the sequence to transfer their information to corresponding stages in shift register 209. Output line 2 at sequencer 207 is then activated to open the multi-pole electronic switch 208.

The next step at sequencer 207 results in activation of output line 3 which closes both read-out switch 210 and read-in switch 211. This permits pulses from read-out clock and sequencer timer 217 to be fed through read-out switch 210 whereby the pulses sequentially shift data from shift register 209 through read-in switch 211 to a storage register 212. Read-out clock and sequencer timer 217 also supplies pulses to the decoder register sequencer 207 to sequentially activate the eight output lines thereof when the sequencer 207 is actuated.

The next step at sequencer 207 results in activation of output line 4 which closes the multi-pole electronic switch 208. The timing of sequencer 207, under the control of sequencer timer 217, is such that by the time switch 208 is closed at sequence step 4, the second tone combination of the vehicle emitter sequence approaches the end of its transmission, and the digital code corresponding to the second combination of tones is set up at the flip-flops in unit 206. Thus, closing of the multi-pole electronic switch 208 tranfers the digital code of the second combination of tones to shift register 209. At sequence step 5 switch 208 is opened; at sequence step 6 read-out switch 210 and read-in switch 213 are closed, transferring data from shift register 209 to storage register 214. At this time each of storage registers 212 and 214 contains a binary coded signal corresponding to one of the two transmitted combinations of tones. If three or more combinations of tones are employed, additional storage registers are required and additional sequence steps are likewise required.

At sequence step 7 the activated signal line 7 from sequencer 207 signals the data computer that there is vehicle identification and status data stored in the storage registers 212 and 214 associated with extension a of scanner 201. The computer is programmed to respond to this signal by reading the data from registers 212 and 214 during the next polling of the decoders by the computer. The operation of the computer is described generally in my above-referenced prior U.S. Pat. No. 3,568,161.

The computer sends a read signal to the extension a portion of the scanner 201. The extension a read terminal of scanner 201 is connected, internally of the scanner, to the read terminal of a sensor identification register 219 associated with the sensor station presently connected to extension a. The read signal from the computer thereby causes the sensor station identification number at register 219 to be read into the computer. This sensor station identification information thus serves to physically locate the vehicle from which coded identification and status information has been received. The computer processes the vehicle identification and status information along with the receiving sensor station identification in a manner described in my aforementioned patent.

Step 8 at sequencer 207 begins after sufficient time has been allowed for the computer to read the data in storage registers 212, 214, and 219. At step 8 line 8 is activated to apply a signal to output extension line a of scanner 201. This signal has the effect of placing extension a in the on-hook condition wherein it is ready to accept another call from one of the sensor stations.

Figure 5:
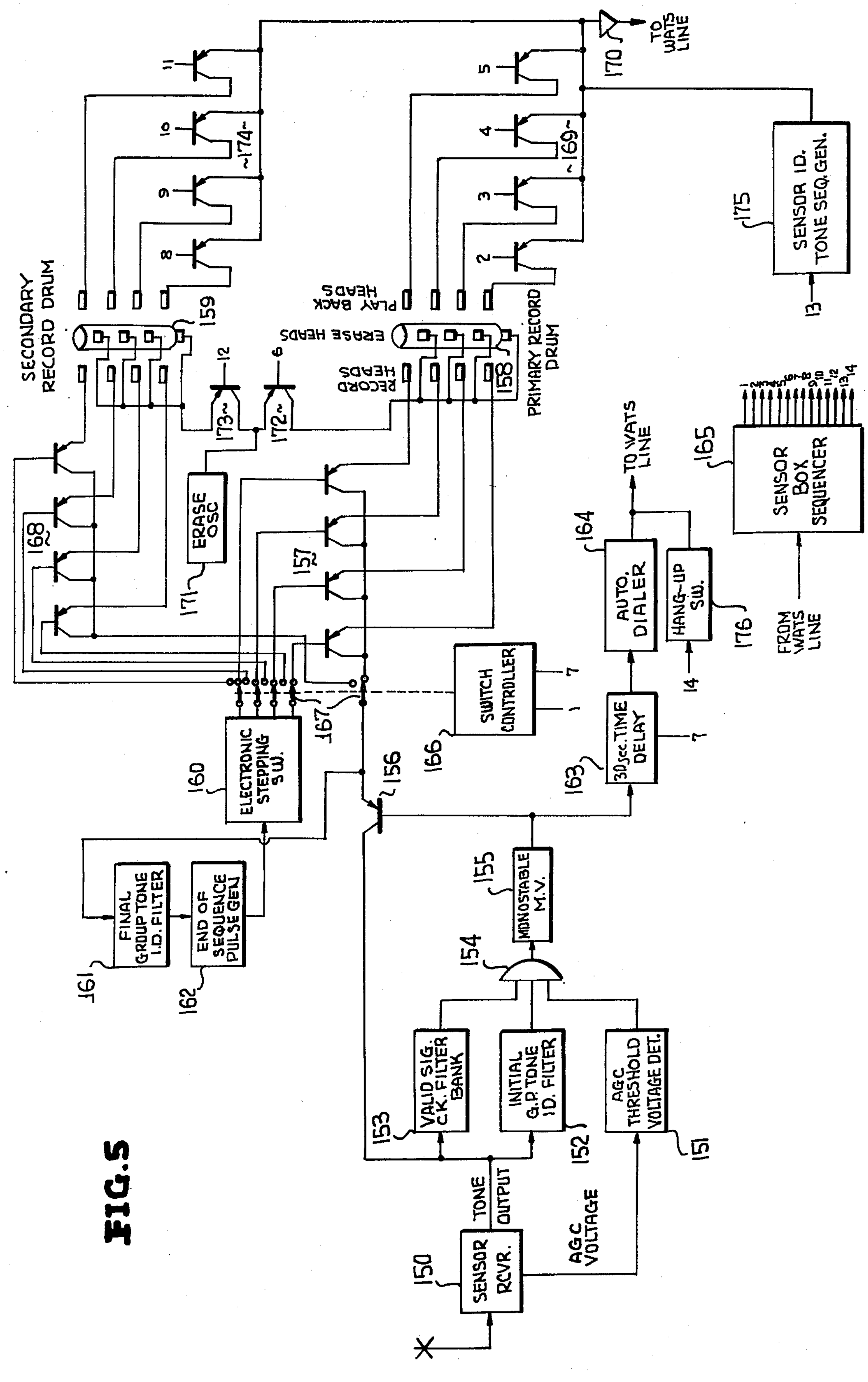
FIG. 5 is a schematic diagram of sensor, holding and dialing circuits which are selectively and automatically interconnected to decoder circuitry via long distance telephone lines.

The circuit of FIG. 4 illustrates the utilization of local telephone lines for conducting received vehicle identification and status coding signals from sensor stations to centrally located decoding equipment. The circuit of FIG. 5 permits the system of the present invention to be utilized with conventional long distance telephone systems, whereby the sensor stations may be located outside the range of the local telephone system which serves the central decoding station. For example, such an arrangement might be utilized to monitor the locations of trucks in a cross country fleet, or of cross country trains, etc. Referring specifically to FIG. 5, sensor receiver 150 is essentially the same sensor receiver described above in relation to FIG. 4. The coding tones which are detected by sensor receiver 150 are applied to an initial group tone identification filter 152, a valid signal check filter bank 153, and an electronic audio switch 156. In addition, an AGC voltage, representing the level of the received signal at sensor receiver 150, is applied to an AGC threshold voltage detector 151. The AGC threshold voltage detector 151, the initial group tone identification filter 152, and the valid signal check filter bank 153 are utilized to check the validity of received signals in order to reduce the probability that noise or other invalid signals are transmitted to the central decoder location. The three circuits shall be described subsequently; for the present however it is sufficient to note that simultaneous output signals from all three circuits result in AND gate 154 being enabled to trigger a monostable multivibrator 155. The output pulse from monostable multivibrator 155 closes the electronic audio switch 156 for a period of time sufficient to permit an entire vehicle emitter signal sequence to be received and processed. Switch 156 passes the decoded tones to the following circuitry. After the coding sequence has been passed by switch 156, monostable multivibrator 155 returns to its stable condition.

The AGC threshold voltage detector 151 provides an output signal only after the level of the received signal at sensor receiver 150 has achieved a predetermined level. For example, the AGC threshold voltage detector circuit may be designed to respond to a signal equivalent to 50 micro-volts or more received at the sensor receiver 150. This prevents the system from responding to weak invalid signals such as might result from noise or unusual atmospheric conditions.

The initial group tone identification filter 152 provides an output signal when it detects the presence of the initial group identification tone in the received signal. Since every initial tone group of every vehicle emitter sequence is identified by a particular tone, circuit 152 reduces the probability that the system will respond to even strong invalid signals since it is improbable that a strong invalid signal will also contain the correct initial group identification tone.

The valid signal check filter bank 153 provides an output signal when at least one of a discrete set of tones is present in the received signal. The initial group of tones of each vehicle emitter sequence is made up of the initial group identification tone plus at least one other tone of a discrete set of tones. Circuit 153 prevents AND gate 154 from becoming enabled unless at least one valid tone other than the initial group identification tone is present in the detected signal. In some cases, the validity check provided by circuits 151 and 152 may be sufficient to permit elimination of the validity check performed by circuit 153.

Theoretically, a strong signal made up of pure noise might be capable of triggering the system, since a noise signal would contain all tones within the pass band of the sensor receiver 150. However, sensor receiver 150 has only a limited output range which is adjustable. Since the energy in any true noise signal is spread uniformly across the spectrum included within the receiver pass band, the energy contained in any particular tone frequency is very small. It is therefore possible to adjust the system so that a noise signal will have insufficient signal energy at any discrete frequency to cause either the valid signal check filter bank 153 or the initial tone identification filter 152 to provide an output signal when the sensor receiver 150 is providing an output signal in response to a received noise signal.

After a valid signal is received an electronic switch 156 has been closed by monostable multivibrator 155, the output tones from sensor receiver 150 pass through one of the switches in electronic switch bank 157 to one of the record heads of the primary record drum 158. The record head to which the signal passes is determined by the switch in bank 157 which has been turned on by the electronic stepping switch unit 160.

The primary record drum 158 and the secondary record drum 159 are small magnetic recording drums which revolve at the same angular rate, preferably about a common axis. The angular rate of the drums is such that one revolution takes place during the interval required for a vehicle emitter tone sequence to be transmitted.

While the decoded output signal from sensor receiver 150 is being recorded at the primary drum 158, it is also being passed to the final group tone identification filter 161. When the final group identification tone is present in the signal, the final group tone identification filter 161 passes this tone to the end of sequence pulse generator 162. This end of sequence pulse generator includes an audio detector circuit followed by a differentiating circuit, the latter providing an output pulse of the correct polarity when the final group identification tone ceases. This output pulse causes electronic stepping switch 160 to step to the next position, whereby the one actuated switch in bank 157 is deactuated and the next switch in the bank is actuated. The next received vehicle emitter signal is then recorded by the recorder head connected to this duly actuated switch.

It should be noted that the utilization of a final group identification tone is desirable to provide a signal which positively identifies the end of a vehicle emitter sequence. However, the mere cessation of a vehicle emitter signal, as detected by sensor receiver 150, may be employed to signify the end of a vehicle emitter sequence.

The output signal from monostable multivibrator 155 not only closes switch 156 but also initiates a time delay at the time delay unit 163. The delay provided by time delay unit 163 is adjustable over a range from a few seconds to a few minutes, depending upon system usage, etc. Nominally, the time delay interval would be on the order of 30 seconds, after which automatic dialer 164 is activated. During the 30 second delay interval, any additional emitter signal sequences which are received by sensor 150 are recorded in the manner previously described at different record heads of primary record drum 158. In the example illustrated in FIG. 5 up to four sets of emitter sequences can be recorded within the 30 second delay period. Additional record heads and associated circuitry may be provided to permit a larger number of emitter sequences to be recorded during the delay interval.

There are two main functions served by time delay unit 163. One purpose relates to the fact that a vehicle emitter may pulse at least twice while the vehicle is within range of sensor station 150. Time delay unit 163 prevents automatic dialer 164 from being activated two or more times to have essentially the same emitter information transmitted via the long distance WATS line. The second purpose of the time delay unit is to permit location information from several closely spaced vehicles to be transmitted over the WATS line during one dialed call. Once the time delay unit 163 is activated, automatic dialer 164 is activated a predetermined period of time later, regardless of whether additional emitter signals have been received during the delay interval. After activating automatic dialer 164, the time delay unit 163 cannot again activate the automatic dialer until output line number 7 from the sensor box sequencer 165 is activated. The sensor box sequencer 165 is described below.

When the automatic dialer 164 is activated, it dials the system computer station at the central decoding office. If the line is busy, the automatic dialer continues to re-dial until the line to the computer is free. It is assumed that a circuit such as that illustrated in FIG. 4 receives the signal transmitted on the WATS line by the circuit of FIG. 5.

Upon completion of the call to the computer station, the computer returns a signal to the sensor location which activates sensor box sequencer 165. The sensor box sequencer then provides output signals at each of its fourteen output lines in sequence to control transmission of the vehicle location information back to the computer station.

When output line number 1 of the sensor box sequencer 165 is activated, switch controller 166 is energized to change the positions of each of the two-position ganged switches 167. In one position of these switches (the position illustrated in FIG. 5) the switches in switch bank 157 permit individually received signals to be recorded at different heads on primary record drum 158. In the other position of switches 167, switch bank 168 permits individual messages to be recorded on individual record heads at secondary drum 159. Electronic stepping switch 160 controls the sequence of actuation of switches within the active bank 157 or 168. The purpose of switching the output signal from sensor receiver 150 between the primary and secondary record drums is so that signals can be received and recorded by the system while the sensor information on the one drum is being transmitted to the central office computer decoder.

When output line number 2 of sequencer 165 is activated, the first electronic audio switch in bank 169 connects a corresponding playback head from primary drum 158 to the WATS line via amplifier 170. In this manner a vehicle emitter sequence recorded on one section of the drum is transmitted to the computer station. Likewise, activation of each of output lines 3, 4 and 5 from sequencer 165 actuates a respective audio switch in switch bank 169 to permit transmission of a vehicle emitter sequence recorded on a corresponding section of primary record drum 158. The timing between activation of output lines 2, 3, 4 and 5 of sequencer 165 is such to permit storage of the transmitted tones at the decoding circuitry located at the computer station.

Activation of output line number 6 from sequencer 165 closes electronic switch 172, thereby applying an erase signal from the erase oscillator 171 to all four erase heads of primary record drum 158. This erases all tone signals from the primary record drum so that it is able to again record received vehicle emitter tone sequences.

When the output line number 7 from sequencer 165 is activated, switch controller 166 is actuated to move switches 167 from their secondary record drum circuit positions to their primary record drum circuit positions. In addition, time delay circuit 163 is reset at this time in order that it may again be activated when sensor signals are received. If tone signals have been recorded on the secondary record drum during steps 1 through 7 of sensor box sequencer 165, these recorded tone signals are transmitted to the central office during sequence steps 8, 9, 10 and 11 via switches in bank 174. At sequence step 12 electronic switch 173 is closed and information stored on secondary record drum 159 is erased.

At step 13 of sequencer 165 the sensor identification tone sequence generator 175 provides an output signal on the WATS line. The sensor identification tone sequence generator 175 is a group of tone generators similar to those in the vehicle emitter as illustrated in FIG. 2. The sensor identification tone sequence generators transmit a combination tone sequence over the telephone line to uniquely identify the sensor station from which information is being transmitted. At step 14 in sequencer 165 the hang-up switch 176 is actuated to perform the same function as is effected by hanging up of a telephone on the WATS line; this then releases the WATS line until the automatic dialer 164 is again activated.

Figure 6:
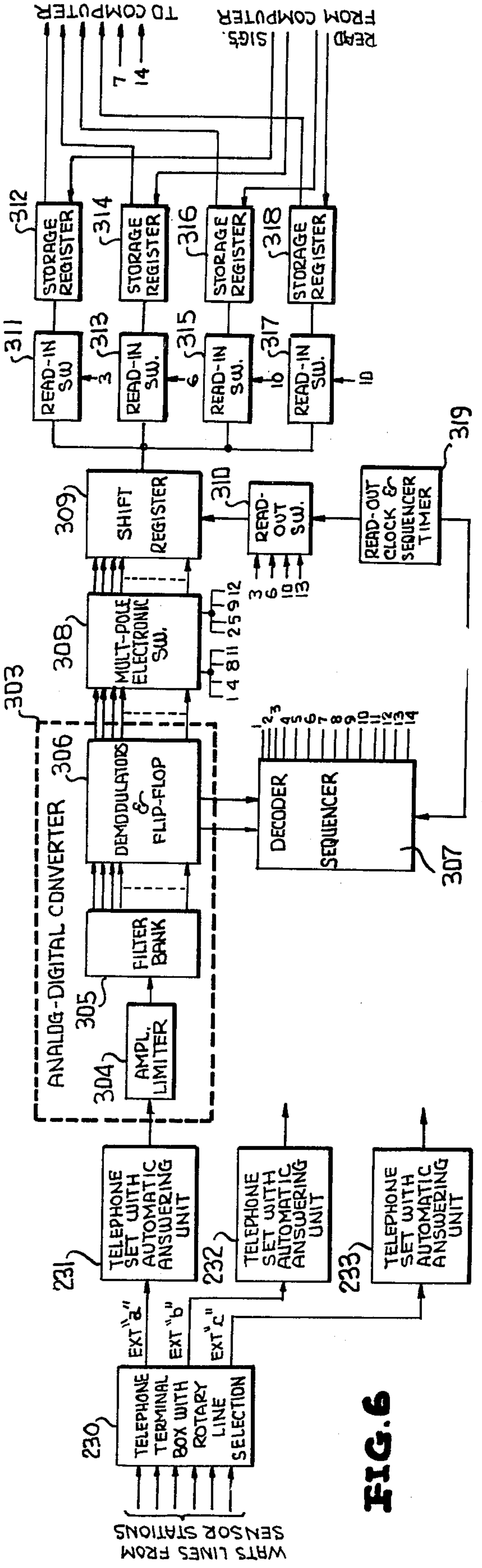
FIG. 6 is a schematic diagram of a decoder circuit for use with the sensor circuitry of FIG. 5.

Decoder circuitry for the sequentially coded system employing WATS lines as in FIG. 5 operates in a manner similar to that described previously in relation to FIG. 4 for a system utilizing dedicated local telephone lines. Such decoder circuitry, for use with WATS lines or other long distance lines, is illustrated in FIG. 6. Referring specifically to FIG. 6, when the automatic dialer 164 of FIG. 5 dials the computer center, the dialing signals are routed to unit 230 which constitutes a telephone terminal box with rotary line selection. Although illustrated separately, the function performed by unit 230 is actually accomplished as a normal telephone company central office function. Specifically, the unit 230 is the regular rotary line selection unit which, if one extension output thereof is busy, switches received calls to the next higher numbered extension. Three such extensions, extension a, extension b and extension c are illustrated in FIG. 6. If all extensions are busy, the caller receives a busy signal, which for purposes of the present system causes the automatic dialer at the remote sensor station to re-dial. If, for example, extension a is free, the call proceeds to unit 231 which is a telephone set with an automatic answering unit. Similar sets 232 and 233 are provided for extensions b and c respectively. If extension a is busy, the call proceeds to unit 232, and if unit 232 is busy the call proceeds to unit 233. The decoding circuitry illustrated in conjunction with unit 231 is repeated for each of units 232 and 233.

When a call is received by a telephone set 231, 232 or 233, the automatic answering unit in that circuit returns a sequencer start signal back to the sensor box sequencer 165 in the circuit of FIG. 5. The remote sensor station then transmits the recorded sensor tone information in the manner previously described in relation to FIG. 5. The tones from the sensor are received by the telephone set 231 (or 232, 233) and fed to the analog-to-digital converter 303. This analog-to-digital converter operates in the same manner as the analog-to-digital converter 203 illustrated and described with reference to FIG. 4 hereinabove. In this respect, the analog-to-digital converter 303 includes an amplifier limiter circuit 304, a filter bank 305, and demodulator and flip-flop circuitry 306. The major distinction between the decoding circuitry of FIG. 4 and the decoding circuitry of FIG. 6 resides in the fact that two flip-flop output lines are connected from demodulators and flip-flops 306 to the decoder sequencer in FIG. 6, whereas only one output line, representing an identified initial group of vehicle emitter sequence tones, is provided from the demodulator and flip-flop circuitry 206 in FIG. 4. One of the output signals from demodulators and flip-flop circuitry 306 is likewise representative that the tone which identifies an initial group of vehicle emitter sequence tones has been detected by one of the flip-flops in unit 306. The other output signal from demodulators in flip-flop unit 306 is provided whenever the demodulators and flip-flops detect the tone which identifies the tone group originating from the sensor identification tone sequencer generator 175 of FIG. 5. This tone signifies the detection of the sensor station identification by circuit 306.

As mentioned previously, the operation of the decoder in the circuit of FIG. 6 proceeds in a manner quite similar to that described in relation to the decoder illustrated in FIG. 4. Timing for the decoder sequencer 307 is provided by the readout clock and sequencer timer circuit 319. When the decoder sequencer receives an indicator signal from circuit 306 which designates that the initial group of tones in a vehicle emitter sequence has been detected, sequencer 307 successively activates its output lines 1 through 6 to cause the vehicle identification and status data to be read into storage registers 312 and 314 in the same manner previously described for reading data into storage registers 212, 214 in FIG. 4. At step 7 of sequencer 307, a signal is fed to the computer which temporarily stores in a buffer storage the vehicle identification and status data from registers 312 and 314 of extension a from unit 230. At this point decoder sequencer 307 waits for the next output signal from demodulator and flip-flop circuitry 306 before continuing its sequence. If a plurality of vehicle tone sequences are being transmitted in one call, the second output signal received by decoder sequencer 307 from circuit 306 represents another initial group tone indicator signal. In such case the decoder sequencer 307 repeats steps 1 through 7 to effect storage of the second vehicle identification and status data at storage registers 312 and 314, and eventually at the computer. The sequence repeats until all vehicle identification and status data recorded at the sensor station from which the call originated has been received and decoded by the decoder and temporarily stored in a buffer storage in the computer. After all vehicle data is so stored, the next tone signal received by the decoder is the signal generated by the sensor identification tone sequence generator 175 of FIG. 5. Reception of this signal results in the other output line from circuits 306 being activated. Activation of this second line from circuitry 306 causes decoder sequencer 307 to successively activate output lines 8 through 13. This causes the sensor station identification data to be read into storage registers 316 and 318 in the same manner previously described in relation to reading vehicle identification and status data in the storage registers 312 and 134. After the sensor station identification data is stored in registers 315 and 318, decoder sequencer 307 proceeds to step 14 at which time a signal is transmitted to the computer to indicate that there is sensor station identification information stored in registers 316 and 318 associated with extension a of the rotary line selection unit 230. The computer, on its next polling sequence of the decoders, rapidly reads the data from storage registers 316 and 318 into the computer buffer storage unit. The computer program provides for the sensor station identification data to be added to each set of vehicle identification and status data that has been stored in the buffer storage unit during the telephone call in progress. The computer program also provides for the combined data to be stored in a memory file such as the memory file designated by the reference numeral 121 in FIG. 5 of my aforementioned U.S. Pat. No. 3,568,161.

The sensor and decoding circuitry illustrated in FIG. 4 may be modified to permit operation with shared or a party-line telephone connections for carrying sensor signals to the decoder of the sensor station. Utilization of a party line system for transmitting sensor-received data in a vehicle location system is based on the assumption that the party lines will be busy only for a very small percentage of time. Specifically, it is assumed that the party lines are busy for such a small percentage of the time that the user of the system can tolerate the occasional loss of sensor information which would result from busy line conditions. The system can be configured so that the vehicle emitter signals take precedence over telephone calls on the system, or vice versa. In the circuit illustrated in FIG. 7, emitter signals take precedence over telephone calls otherwise on the system. This is most likely the more desirable arrangement since the emitter signals cause only a fraction of a second interruption of any telephone call on the system; in most instances this does not affect the intelligibility of conversation.

Figure 7:
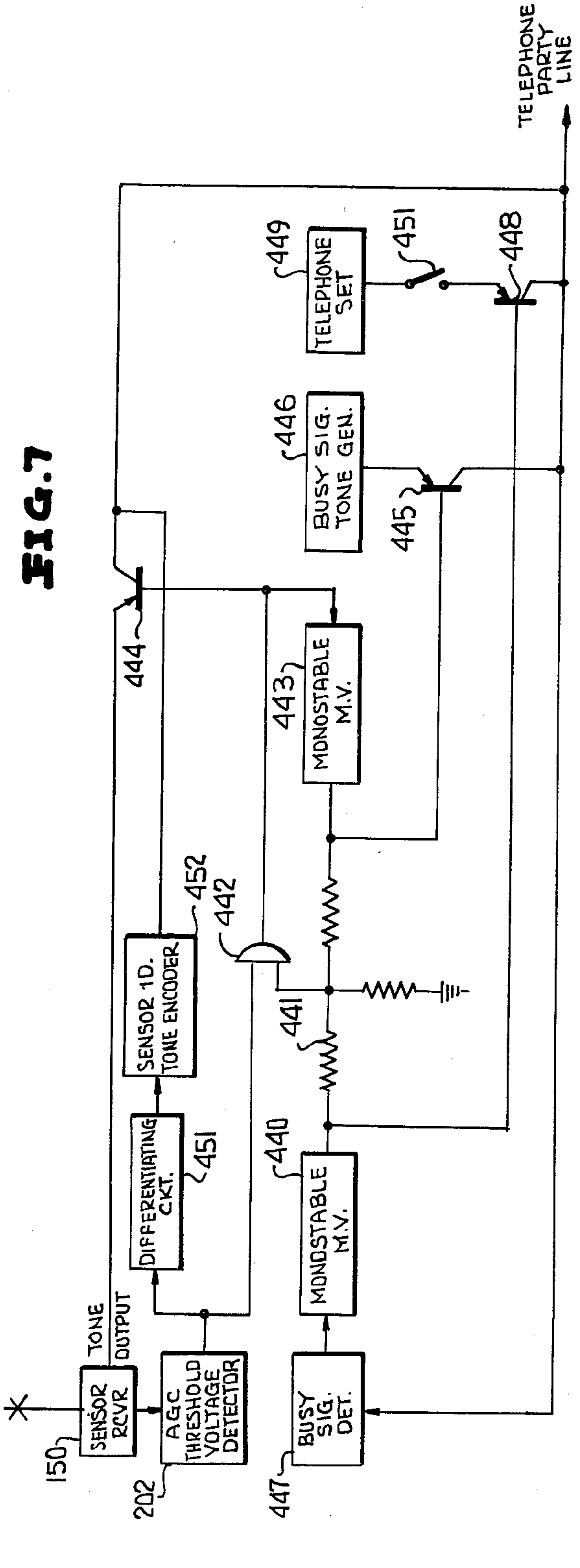
FIG. 7 is a schematic diagram of a sensor station suitable for use with a party line telephone connection to a decoder station.

Referring specifically to FIG. 7 of the accompanying drawings sensor receiver 150 and AGC threshold voltage detector 202 are substantially the same as similarly designated units in the circuit of FIG. 4. In the absence of an output signal from the busy signal detector circuit 447, monostable multivibrator 440 remains in its stable condition in which it applies an output signal through a decoupler network 441 to one input terminal of AND gate 442. The output signal from monostable multivibrator 440 is also connected to an electronic audio switch 448 which is closed by the stable state signal from the multivibrator to connect telephone set 449 through the telephone off-hook switch 451 to the telephone party line. If the system is employed for identification of vehicles owned by the municipal government, the telephone set 449 is ideally a fire call box or police call box telephone set.

When sensor receiver 150 receives a signal strong enough to trigger AGC threshold circuit 202, AND gate 442 is enabled and closes the electronic audio switch 444. Switch 444, when closed, connects the demodulated output tones from sensor receiver 150 to the telephone party line.

The output signal from AND gate 442 also triggers monostable multivibrator 443 to its unstable state in which it applies a signal through decoupler network 441 to the first input terminal (i.e. the same input terminal fed by monostable multivibrator 440) of AND gate 442. In addition, the output signal from monostable multivibrator 443 in its unstable state closes electronic audio switch 445 which connects the output signal from the busy signal tone generator 446 to the telephone party line. The busy signal tone from generator 446 is at a frequency other than those utilized for the identification and status codes elsewhere in the system. The presence of the busy signal tone on the party line is detected by the busy signal detector 447 at all of the sensor stations connected to the same party line. Busy signal detector 447 is a simple audio filter and detector circuit. Upon detecting a busy signal on the line, the busy signal detector 447 triggers monostable multivibrator 440 into its unstable state in which the signal applied to AND gate 442 and switch 448 is removed. Removal of the signal from AND gate 442, however, has no effect because monostable multivibrator 443, in its unstable state, maintains the gate 442 enabled. Audio switch 448 opens when monostable multivibrator 440 is in its unstable condition, thereby disconnecting the telephone set 449 from the party line.

When the emitter signal sequence terminates, the output signal from the AGC threshold voltage detector 202 is removed to disable AND gate 442. This in turn opens electronic audio switch 444 to disconnect the sensor receiver 150 from the party line. Also, with no output signal from AND gate 442 monostable multivibrator 443, after a short delay, reverts to its stable condition in which it no longer applies an input signal to AND gate 442. Electronic switch 445 is opened thereby, disconnecting the busy signal generator 446 from the telephone party line.

Termination of the vehicle emitter tone sequence, and the resulting drop of the output signal from the AGC threshold voltage detector, produces an output signal from the differentiating circuit 451. This output signal actuates the sensor identification tone encoder 452. Encoder 452 generates a tone code which identifies the sensor station which has been transmitting vehicle identification and status data on the telephone party line. The sensor identification tone encoder is similar to the vehicle identification tone encoder circuit illustrated in FIG. 2. However, in most instances the sensor identification tone encoder 452 generates only a single group tone code combination signal rather than a sequence of groups because the number of unique tone code combinations required to identify the sensor stations is usually quite limited. Monostable multivibrator 443, in reverting to its stable condition, is designed to have a built in delay which is sufficiently long to maintain electronic switch 445 closed to keep the busy signal on the telephone party line until after the sensor identification tone encoder signal has been transmitted to the decoder. After the sensor identification code has been transmitted and monostable multivibrator 443 has returned to its stable condition, thereby removing the busy signal from the telephone party line, the sensor station is again ready to receive another emitter signal.

If a sensor receiver 150 receives a vehicle emitter signal at the same time that another sensor station using the same party line receives a vehicle emitter signal, the later received signal is blocked from the line. The first sensor station 150 to receive a vehicle emitter signal connects the busy signal tone to the telephone party line through electronic switch 445. When a busy signal is on the line, the busy signal detector 447 in all other sensor stations sharing the party line provides an output signal which causes monostable multivibrator 440 to switch to its unstable condition. Under this circumstance, AND gate 442 is inhibited and cannot become enabled to close switch 444 even if the AGC threshold voltage detector 202 provides an output signal. In the one sensor station which is transmitting information to the computer, however, monostable multivibrator 443 assures that AND gate 442 remains enabled even though the busy signal detector 447 in that sensor station senses the busy signal on the party line and switches monostable mulitvibrator 440 to its unstable condition.

Figures 8, 10:
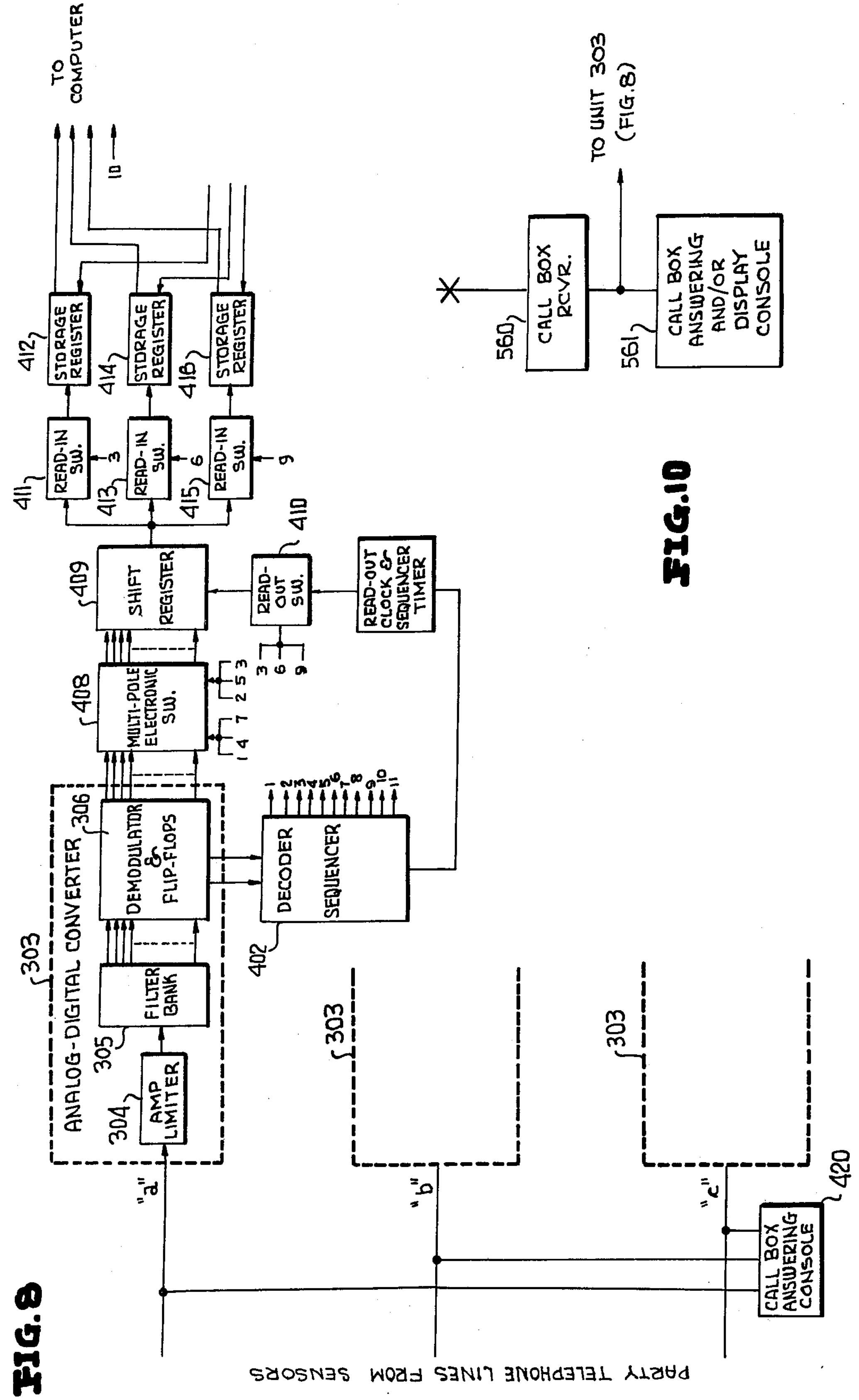
FIG. 8 is a schematic diagram of a decoder station for use with a party line telephone connection to a sensor station of the type illustrated in FIG. 7.
FIG. 10 is a block diagram of a portion of a decoder circuit, illustrating the modification required to permit the decoder to accept radio-transmitted signals.

A modified decoder circuit, for use in a party line connection system with the sensor station circuit of FIG. 7, is illustrated in FIG. 8 to which specific reference is now made. In the decoder circuit of FIG. 8 it is assumed that the telephone party line is a police and/or fire call box line. Call box lines are shown as terminating at a call box answering console 420 which is the regular telephone console associated with call box systems. In the system of FIG. 8, each party line a, b, c is connected to a respective decoder circuit; however, depending upon system usage and configuration, it is possible for several party lines to share a single analog-to-digital converter by means of a cross-bar scanner such as scanner 201 illustrated and described in reference to FIG. 4.

Analog-to-digital converter 303 in FIG. 8 is identical to the analog-to-digital converter bearing the same reference numeral in FIG. 6. The demodulator and flip-flop unit 306 has two separate output signals to decoder sequencer 402 to perform the same two functions at decoder sequencer 402 as are performed at decoder sequencer 307 in FIG. 6. Decoder sequencer 402 provides output signals in sequence at output lines 1 through 6 to cause the vehicle identification and status data to be read into storage registers 412 and 414 in the same manner as vehicle identification and storage data is read into storage registers 312 and 314 in the circuit of FIG. 6. The next tone received by the decoder in FIG. 8 is the signal generated by the sensor identification tone encoder 452 in the circuit of FIG. 7. Reception of this tone causes the other output signal from unit 306 to actuate decoder sequencer 402 and cause it to successively proceed to steps 7 through 9. During these steps the sensor station identification data is read into storage register 416. At step 10 of decoder sequencer 402 a signal is applied to the computer to indicate that there is vehicle identification and status data and sensor identification data stored in the registers 412, 414, 416 associated with telephone party line a. The computer, during its next polling of decoders, rapidly reads the data from registers 412, 414 and 416 into the computer. The computer program provides for this combined data to be stored in a memory file in the computer.

The principles of the present invention are applicable to radio links between sensor stations and central decoder stations as well as to dedicated telephone line connections of the type previously described. A sensor station for use with a radio link to a central decoder station is illustrated in FIG. 9. In the particular illustration, the sensor station is a radio call box. A vehicle locator system utilizing radio call boxes for transmitting the sensor data is quite similar to the previously described telephone party line system. For a radio call box system utilizing full duplex radio call boxes (i.e. call boxes capable of transmitting and receiving at the same time), the radio call box system is identical to the telephone party line system shown in FIGS. 7 and 8 with a radio link merely replacing a telephone party line. Because of this identity of configuration, separate drawings showing a radio link in place of a party telephone line are not shown herein. The system described in relation to FIG. 9 assumes that, insofar as signals received at the sensor are concerned, the radio call box system is a transmit-only system which automatically re-transmits any vehicle emitter signal it receives to the central decoder station, even though another call box in the system is transmitting at the same time. In the event that emitter signals are simultaneously transmitted, the receiving decoder station provides an invalid output signal which is rejected by the computer. In the system illustrated in FIG. 9, sensor receiver 150, AGC threshold voltage detector 151, and initial group tone identification filter 152 are functionally identical to the similarly designated units described in relation to FIG. 5. In order to reduce the possibility that the radio call box will re-transmit a noise or other spurous signal, actuation of AND gate 554 requires a simultaneous output signal from both the initial group tone identification filter 152 and the AGC threshold voltage detector 151.

The electronic audio switch 156, the final group tone identification filter 161, and the end of sequence pulse generator 162 are all functionally equivalent to the similarly designated units described in relation to FIG. 5. Decoupler circuit 501 functions to permit the output signal from the sensor receiver 150 and the output signal from the sensor identification tone encoder 452 to be fed to the call box radio transmitter 557 on a common input line. Monostable multivibrator 555 is triggered to its unstable state by AND gate 554, and remains in its unstable state for a period of time slightly in excess of that required to transmit a vehicle emitter signal sequence and a sensor station identification code from the radio call box transmitter 557. Electronic audio switch 156 and electronic audio switch 556 are both closed during the interval that monostable multivibrator 555 remains in its unstable state. Closing of electronic audio switch 156 permits the output tone signals from the sensor receiver 150 to pass to the remainder of the system. Closure of the electronic switch 556 functions to key the call box radio transmitter 557, causing it to re-transmit the sensed vehicle emitter tones followed by a transmission of the sensor identification tone code as generated by the sensor identification tone encoder 452.

A radio call box sensor station may be configured to lock out operator-generated voice or control panel signals from the call box, or vice versa. If sensor signals are to take priority, a technique similar to that shown in FIG. 7 would be employed, whereby an output signal from the monostable multivibrator 555 would be utilized to turn off an electronic switch and disconnect the telephone hand set or control panel signals from the radio call box transmitter. The more usual situation in a case of radio call boxes is for operator-generated signals to take priority over sensed vehicle locator signals. The circuit of FIG. 9 is configured so that this will in fact be the case. In the case of voice radio call boxes, which normally have a push-to-talk hand set, switch 502 is of the push-to-talk type. When the push-to-talk switch is not being pushed by a call box operator, switch 502 is in the position shown in FIG. 9. In this position the output signal of decoupler network 501 is fed to radio transmitter 557, and whenever the transmitter is keyed by electronic switch 556, the output signal from decoupler network is transmitted to the base station decoder computer center. Whenever the push-to-talk button is depressed, the output signal from decoupler network 501 is blocked from going to the transmitter because the middle pole of the three-pole switch 502 is in the open position. At the same time another pole of the switch connects the output of the hand set to the radio transmitter while still another pole of switch 502 keys the transmitter.

Many radio call boxes transmit a coded signal instead of a voice signal. One code may be for requesting police systems, another for requesting repair assistance, another for requesting an ambulance, etc. The particular coded signal to be transmitted is determined by which button an operator presses on the call box control panel. In the case of coded signal radio call boxes, switch 502 is ganged to the selector switches on the control panel so that switch 502 is depressed whenever a selector switch is depressed.

FIG. 10 illustrates a decoder circuit for use in a radio call box system in conjunction with the circuit of FIG. 9. Call box receiver 560, in the case of a voice call box system, is the regular receiver normally employed by the system. In the case of coded signal systems, the receiver may be a modified version of the regular receiver, depending upon the method of modulation utilized by the system.

The output signal of receiver 560 is applied to both the standard call box answering and/or display console, and to the decoder/computer system. The decoder system for the configuration would be identical to that for the party line call box system illustrated and described in reference to FIG. 8.

The description set forth thus far herein has pertained to vehicle locator systems. However, it is possible for a pedestrian to carry or wear an emitter whereby a personnel locator function may be performed. Such a system has particular applicability in the case of security guards patrolling large building complexes.

Personnel emitters may utilize either a single tone combination code as described in my aforementioned U.S. Pat. No. 3,568,161 or a sequential code as described in the present application. In either case, it is assumed that the emitter is pulsed in order to reduce the probability of signals from two personnel emitters being received simultaneously by the same sensor station. The pulsing in the case of a personnel emitter can be accomplished by any type of simple timing device, such as a free running multivibrator. This may also be accomplished by a device such as the slow moving vehicle signal supressor unit 87 in FIG. 2 of my U.S. Pat. No. 3,568,161. The pulsing of the personnel emitter is at a low duty cycle, for example two tenths of a second pulse duration with a two second repetition interval. Low duty cycle pulsing makes the probability of simultaneous pulsing by two or more emitters quite small; nevertheless it will occassionally occur in typical personnel locator systems. Loss of locator data in personnel locator systems, due to simultaneous pulsing of emitters, may be in some instances unacceptable and to a lesser extent, since it usually does not occur as frequently, this may also be a problem with vehicle locator systems. In either personnel or vehicle locator systems, it is possible to include circuitry to inhibit emitters in a closely spaced group from pulsing until after the first emitter to pulse has completed its pulsing operation. The circuit of FIG. 11, to which specific reference is now made, is an example of how emitter pulsing may be delayed.

Input signal to the emitter pulse delay network of FIG. 11 is the regular emitter pulsing signal. In a single combination tone signal system, as described in the referenced U.S. Pat. No. 3,568,161, the parked vehicle signal suppressor and the slow moving vehicle signal suppressor (i.e. elements 83 and 87 of that patent) are replaced in the case of a personnel locator system by a timing device such as a free running multivibrator which generates an emitter pulsing signal. The suppressor cut-out switch (element 85 in the aforementioned patent) is also eliminated and the emergency signal switch (element 77 of the aforementioned patent) is connected to continuously key the emitter when actuated. Therefore, in the case of a personnel locator system, the input signal to the pulse delayer network is the output signal of the timing device which generates the emitter pulsing signal in the personnel emitter. In the case of a vehicle locator system, the input signal to the pulse delayer network is the output signal of a monostable multivibrator 143 illustrated in FIG. 2 of the present application.

For purposes of explanation it is assumed that the system is designed to have an emitter pulse, or pulse sequence, lasting 240 milliseconds, and that in order to allow for circuit irregularities the pulse delayer network is designed to provide a delay of 250 milliseconds. In the absence of any signals from the pulse delayer receiver 604 in FIG. 11, monostable multivibrator 602 remains in a stable state. In this stable state, monostable multivibrator 602 closes switch 601 and opens switch 603. The period of monostable multivibrator 602 is 250 milliseconds. Therefore the pulse delayer circuit of FIG. 11 remains in its stable condition, with switch 601 closed and switch 603 open, if there is no nearby emitter which has pulsed in the past 250 milliseconds. When an emitter pulsing signal enters the circuit, it operates in the following manner. If no nearby emitter has pulsed within the past 250 milliseconds, electronic switch 601 is closed and electronic switch 603 is open. The emitter signal passes directly through OR gate 605 to the emitter transmitter where it is transmitted without delay. The pulse signal from OR gate 605 is also applied to differentiating circuit 606 which responds with an output spike coinciding with the leading edge of the emitter pulse signal. Pulse amplifier and shaper circuit 607 amplifies and shapes the spike into a high voltage pulse which for purposes of explanation can be considered to be 1 millisecond long. This 1 millisecond pulse is applied to the pulse delayer transmitter 608, causing it to provide an RF signal for 1 millisecond.

The pulse delayer transmitter 608 operates at a frequency which is separated widely from the emitter transmitter frequency. A typical frequency for the pulse delayer transmitter is between 70 MHz and 2000 MHz. Since the pulse delayer transmitter operates at a very low duty cycle (i.e. less than 1 millisecond out of 250 milliseconds), the low power pulse delayer transmitter 608 is capable of putting out an RF signal having a peak power on the order of 1 watt. This permits the pulse delayer receiver to be a relatively insensitive receiver. The power output of the pulse delayer transmitter 608 and the sensitivity of the receiver are adjustable so that the transmission range is sufficient to operate any pulse delayer receiver associated with any other emitter that may also be within the range of the same sensor station.

The pulse which is fed to the pulse delayer transmitter 608 is also fed through a voltage divider 609 to electronic switches 610 and 611. Both of these switches are electrically closed by the voltage pulse provided by the pulse amplitude and shaper circuit 607. The closing of electronic switch 610 grounds the antenna of the pulse delayer receiver 604 to protect it against the strong RF output pulse provided by the pulse delayer transmitter 608. The closing of electronic switch 611 grounds the output terminal of the pulse delayer receiver 604 so that it does not provide an output signal to the monostable multivibrator 602 and trigger that monostable multivibrator when the pulse delayer transmitter 608 of the same sensor station transmits. Electronic switches 610 and 611 return to their normal open condition immediately after the pulse delayer transmitter 608 provides its output pulse.

Assuming that a regular emitter pulsing signal enters the pulse delayer network of FIG. 11, if a nearby emitter with a pulse delayer transmitter has pulsed within the past 250 milliseconds, the pulse delayer network operates in the following manner. The signal transmitted by the pulse delayer transmitter 608 of the nearby emitter causes the pulse delayer receiver 604 to receiver this pulse and provide an output signal. This output signal triggers monostable multivibrator 602 into its unstable condition wherein it remains for 250 milliseconds, during which electronic switch 601 is open and electronic switch 603 is closed. In this condition the regular emitter pulsing signal is prevented from passing through electronic switch 601 to the emitter transmitter via OR gate 605, and instead the emitter pulsing signal passes through electronic switch 603 to the differentiating circuit 612. The spike generated at differentiating circuit 612 triggers monostable multivibrator 613 into its unstable state in which it remains for 250 milliseconds. During this interval monostable multivibrator 613 maintains AND gate 614 primed. At a time 250 milliseconds after the nearby emitter has pulsed, monostable multivibrator 602 switches back to its stable condition. Differentiating circuit 615, which receives the output signal from monostable multivibrator 602, responds to the change of state in the multivibrator by providing a sharp voltage pulse. This pulse passes through the primed AND gate 614 to trigger monostable multivibrator 615. In its unstable state monostable multivibrator 615 provides an output signal which duplicates the regular emitter pulsing signal that is normally applied to the pulse delayer network of FIG. 11. This causes the emitter transmitter to provide an output signal for a predetermined period of time, which for present purposes is assumed to be 240 milliseconds. This also causes the pulse delayer transmitter signal 608 to emit a 1 millisecond pulse by the same means that has previously been described.

Alternatively, if the pulse delayer network of FIG. 11 is incorporated in a vehicle locator system as opposed to a personnel locator system, the voltage pulse from AND gate 614 proceeds via the dashed line in FIG. 11 to monostable multivibrator 616. This multivibrator provides an output signal which is equivalent to the output signal from monostable multivibrator 140 illustrated in FIG. 3 of the present application. The output signal from monostable multivibrator 616 enables OR gate 617. The other input signal to OR gate 617 is the output signal from the odometer-controlled emitter pulser illustrated in FIG. 3. The output signal from OR gate 617 is applied to AND gate 141 in FIG. 2 herein in place of the signal applied directly from the odometer controlled emitter pulser.

Figure 12:
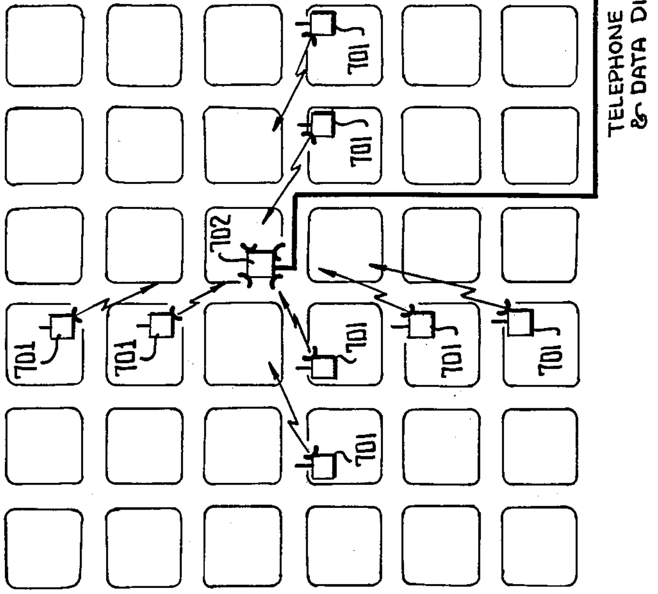
FIG. 12 is a diagrammatic illustration of a modification of the present invention wherein satellite sensor stations are employed in conjunction with main sensor stations.

The accuracy of any of the vehicle location systems described herein can be increased very economically through the use of satellite sensors positionally distributed around the main sensor locations and connected to the main sensor by low power microwave links. This concept is particularly applicable to dedicated line systems such as the one shown in FIG. 4. FIG. 12 depicts a configuration of eight satellite sensors 701 distributed around a main sensor 702. Each satellite sensor 701 includes a regular sensor receiver, such as receiver 150 shown in FIG. 4 plus a microwave transmitter and antenna that would automatically relay the output of the sensor receiver over low power microwave link to the main sensor location. The main sensor 702 includes, in addition to its regular sensor receiver, one or more microwave receivers for receiving the sensor data from each of the satellite sensors. The sensor data from the satellite sensors 701 as well as from the main sensor 702 are transmitted via the main sensor dedicated telephone line to the central decoder. Party lines or radio links, such as from radio call boxes could also be used for transmitting the satellite and main sensor data back to the central decoder. However, if party lines or radio links are used there is a greater probability of lost data resulting from simultaneous transmissions of data from different vehicles over the same party line or radio link.

Figure 13:
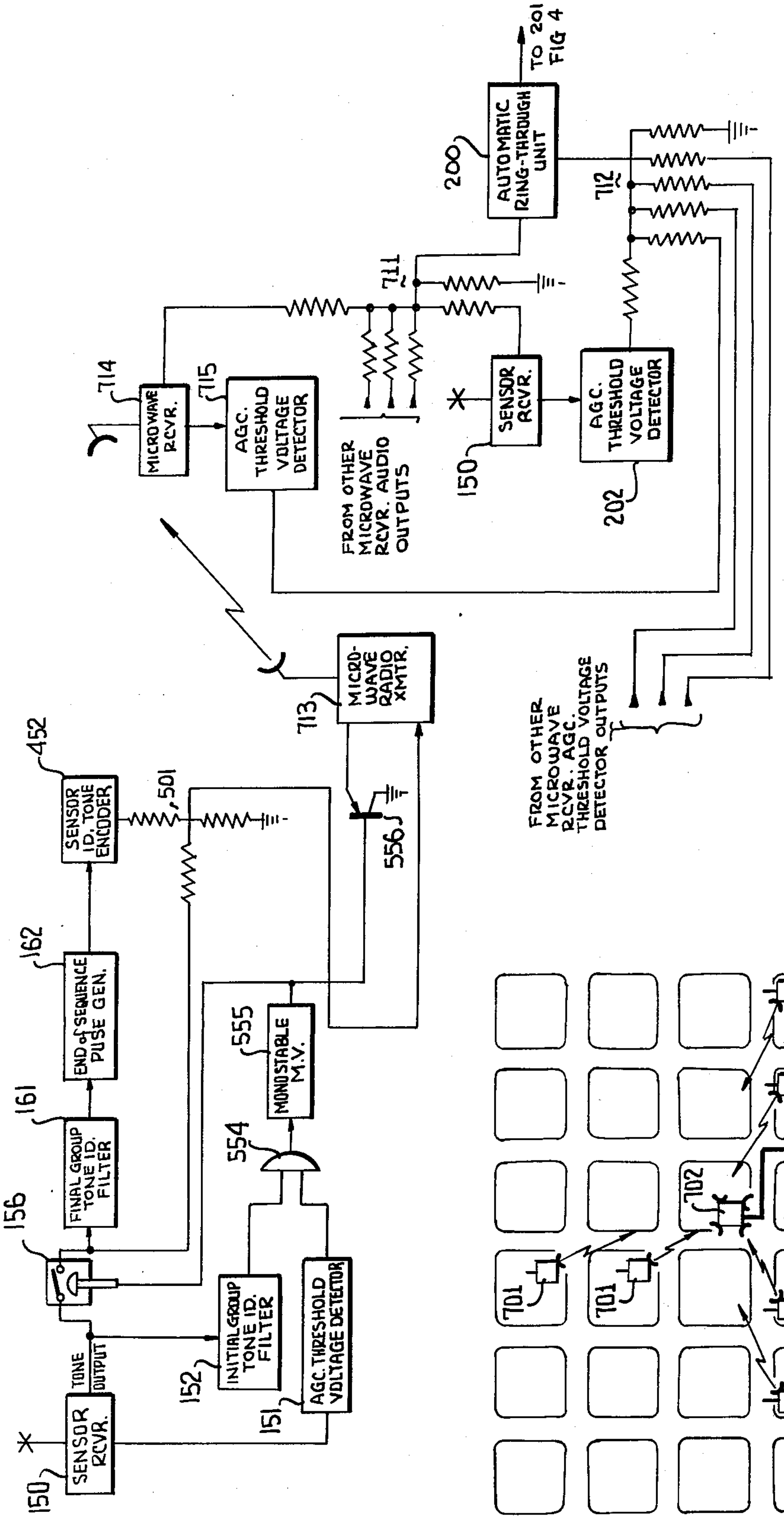
FIG. 13 is a schematic diagram of a satellite sensor station for use in the system of FIG. 12.

The configuration of a satellite sensor station is very similar to that for a radio call box sensor station as shown in FIG. 9 with the microwave radio transmitter 713 replacing the radio call box transmitter. As illustrated in FIG. 13, the main sensor station is the same as that shown in FIG. 4 except that the audio output of the microwave receivers 714 and the output signal from the AGC threshold detector 715 of the microwave receivers are connected in parallel through appropriate resistive decoupling networks 711 and 712, respectively, with the output signal of the main sensor receiver 150. FIG. 13 is a diagram of a satellite sensor station along with the microwave link to the main sensor station. Sensor receiver 150, AGC threshold voltage detector 151, initial group tone identification filter 152, electronic audio switch 156, final group tone identification filter 161, end of sequence pulse generator 162, sensor identification tone encoder 452, decoupler circuit 501, AND gate 554, monostable multivibrator 555, and electronic switch 556 are all functionally identical to the similarly designated units described in relation to FIG. 9 except that the electronic switch keys the microwave transmitter 713 instead of a conventional radio call box transmitter and the audio tone output from decoupler 501 is fed directly to the modulator circuit of the microwave transmitter 713 instead of to the audio circuit of a call box transmitter. It is assumed that the satellite sensor station does not also serve as satellite radio call box station and consequently the push-to-talk switch 502 of FIG. 9 is not included in FIG. 13; likewise, the microwave transmitter 713 does not include a call box handset and control panel as shown with the radio call box transmitter 557 in FIG. 9. However, satellite sensor stations could also serve as satellite call box stations in which case the push-to-talk switch 502 and the radio handset control panel would be included and would function in the same manner as that described in relation to FIG. 9.

The automatic ring-through unit 200 is functionally identical to the similarly designated unit described in relation to FIG. 4. With a system of satellite sensors, the output of the automatic ring-through unit 200 feeds a solid state switching matrix scanner 201 as described in relation to FIG. 4 and the remainder of the system for decoding and reading the emitter signals into a computer is identical to that described in relation to FIG. 4.

Vehicle identification, vehicle status and other intelligence conveying functions are described herein as being accomplished by a technique of multiple tone coding. This coding technique has been described because I believe it to be the most practical technique. The encoder in the vehicle and the sensor stations are both comparatively simple devices when multi-tone coding is employed. Any telephone line or radio link designed for voice operation will normally be satisfactory for carrying these signals without need for any special conditioning of the lines or circuits; and the system as a whole is relatively insensitive to impulse noise. However, all of the intelligence conveying functions that are described as being accomplished by means of tone coding herein and in my referenced prior patent could be accomplished by utilizing conventional digital coding techniques. Digital coding techniques require that the emitter be a more complicated device; in some instances the sensor stations must be more complicated. For instance, in any system where the sensors are not connected to dedicated telephone lines it is necessary for the sensor to generate and transmit a sensor identification signal code. In a well designed digitally encoded system this would normally be accomplished by transmitting a digital code to the sensor itself which the sensor would recognize and then cause the sensor identification code to be transmitted. This would complicate the sensor station by making it necessary to have both a digital decoder and a digital encoder in the sensor station. Such would be the case in systems configured in accordance with FIGS. 5 and 7 of this patent application.

Digitally encoded systems are more sensitive to impulse noise, and telephone lines and radio links adequate for carrying voice signals might not be adequate for carrying digital signals. However, for certain applications, a system employing digital techniques may be preferable.

Although digital coding techniques could be used in place of the tone coding techniques described herein and in my referenced patent, diagrams showing how digital coding techniques could be employed have not been included because digital coding techniques are conventional and could readily be adapted to the inventive concepts described herein.

Typically, a digital encoder would comprise a message generator that monitors data from a number of sources on the vehicle; it synthesizes a digital word containing all information necessary for meeting the vehicle location and status requirements of the system; and it couples this word to the emitter modulator. A multiplixer (or commutator) reads each line sequentially, thereby generating the data bits comprising the word. In addition the encoder has circuitry to add additional bits for synchronization, error correction, and other data handling functions. Depending on the number of vehicles in the system and the amount of status data to be transmitted by the vehicles, it is anticipated that a digitally encoded system requires a word of not less than 32 bits nor more than 64 bits.

It is to be understood that the different embodiments described herein are only representative of the inventive concept and should not be construed as the only possible embodiments. For example, whereas amplitude modulation is used in the emitter described in relation to FIG. 2, frequency or phase modulation could likewise be employed.

Whereas the coded tone grouping feature, utilizing each oscillator to provide more than one frequency, is a significant advance in and of itself, this feature need not be used in conjunction with the long distance, party line, odometer-control, personnel locator, and other features described herein.

While I have described and illustrated specific embodiments of my invention, it will be clear that variations of the details of construction which are specifically illustrated and described may be resorted to without departing from the true spirit and scope of the invention as defined in the appended claims.

I claim:

1. In a system for monitoring the location of movable objects relative to multiple prescribed locations:

an emitter carried by each movable object for automatically transmitting coded signals uniquely identifying that movable object, transmission from said emitters being at some nominal power level;

a plurality of sensor stations, at least one at each of said prescribed locations, each sensor station being arranged to receive signals from an emitter located within a predetermined distance from that sensor station, said prescribed locations being spaced sufficiently to prevent the signal transmitted by an emitter at said nominal power level from being received at more than one sensor station at a time;

a central processing station; and means for automatically transferring received coded signals and sensor station location signals from said sensor stations to said central processing station;

wherein each emitter is characterized by the transmission of code tones during plural successive intervals, plural code tones being transmitted simultaneously during each interval, each emitter including:

a plurality of oscillators for providing code tones;

actuable control means for switching the frequency of at least one of said oscillators between plural discrete frequencies;

timing means for defining said plural intervals; with pre-established time durations transmitter means responsive to said timing means for transmitting said code tones simultaneously during at least two successive intervals of said plural intervals; and means responsive to said timing means for actuating said control means to change the frequency of said at least one oscillator from one to the other of said two successive intervals.

2. The system according to claim 1 wherein said at least one oscillator operates at the same frequency during the first of said successive intervals in each emitter, said same frequency identifying said first of said successive intervals.

3. The system according to claim 2 wherein all of said oscillators are arranged to have their frequencies switched by said control means in said two successive intervals.

4. The system according to claim 1 wherein the combined code tones transmitted during at least one of said intervals represent the identity of the movable object from which the tones are transmitted, and wherein the combined code tones transmitted during at least another of said intervals represent a condition associated with the movable object from which the tones are transmitted.

5. The system according to claim 1 wherein said movable objects are motorized vehicles each having an odometer, each odometer including a movable member which moves at a rate proportional to vehicle speed, and wherein said transmitter means includes logic means responsive to said movable odometer member for repetitively transmitting said sequence of code tones at a repetition rate determined by the rate of movement of the movable member.

6. The system according to claim 5 wherein said movable member comprises an odometer cable arranged to rotate in response to movement of said vehicle, and wherein said logic means comprises:

means for generating a count pulse for each complete rotation of said odometer cable;

divider means for counting each count pulse and providing an actuator pulse each time a predetermined number of count pulses is counted; and gating means for gating on said transmitter means in response to said actuator pulse.

7. The system according to claim 6 further comprising means for periodically gating on said transmitter means in response to a predetermined time delay between successive actuator pulses.

8. The system according to claim 1 wherein said sensor stations are connected to said central processing station via respective telephone lines used solely for transmission of signals between said central processing station and a respective sensor station.

9. The system according to claim 1 wherein said sensor stations are connected to said central processing station via telephone party lines.

10. The system according to claim 1 wherein said sensor stations communicate with said central processing station via long distance telephone lines, wherein each sensor station includes: means for temporarily storing received code tones; means responsive to reception of code tones for automatically attempting to establish connection to said central processing station on said long distance telephone lines; and means responsive to establishment of said connection for transmitting the temporarily stored code tones to said central processing station via said established connection on said long distance telephone lines.

11. The system according to claim 1 wherein said sensor stations communicate with said central processing station via a radio channel, said sensor stations each including: a radio transmitter tuned to said channel; and means responsive to reception of code tones for actuating said radio transmitter to transmit said code tones to said central processing station.

12. The system according to claim 1 further characterized in that said transmitter means is inhibited from transmitting code tones when its emitter is proximate a further emitter having a further transmitter means which is in the process of transmitting code tones, each emitter including:

a blanking transmitter for transmitting a blanking pulse when said transmitter means is transmitting code tones;

a blanking pulse receiver for receiving blanking pulses transmitted from other emitters which are located within a predetermined distance from said each emitter; and delay means for inhibiting said transmitter means for a period of time greater than the duration of said plural successive intervals.

13. In a vehicle locator system of the type in which vehicles carry emitters which transmit code signals for reception at individual sensor stations dispersed throughout a prescribed area or route, vehicle speedresponsive apparatus associated with each emitter for assuring that a vehicle passing a sensor station transmits said code signals at least once while in the receiving range of the passed sensor station, said apparatus comprising:

an odometer cable;

pulsing means for sensing rotation of said odometer cable and providing a gating pulse for every n rotations of said odometer cable, where n is greater than one; and gating means responsive to each gating pulse for actuating said emitter to transmit said code signals.

14. The system according to claim 13 further comprising means responsive to elapse of at least a predetermined period of time between successive gating pulses for actuating said emitter to transmit said code signals.

15. The system according to claim 13 wherein each emitter includes:

a plurality of code tone oscillators, each switchable to operate at least at two frequencies;

timing means for dividing the transmission of code tones into at least two intervals; and means for switching the frequencies of said oscillators so that each operates at two different frequencies in said two intervals, respectively.

16. A vehicle identification system of the type in which vehicles carry emitters for transmitting code signals to sensor stations spaced along a prescribed route or within a prescribed geographic area, said system being characterized in that said sensor stations communicate with a central processing station via long distance public telephone lines, said system including:

at said sensor stations:

means for detecting when code signals have been received from a vehicle emitter;

means for temporarily storing the received code signals until they are transmitted to said central processing station;

means responsive to detection of received code signals for automatically dialing said central processing station on said long distance public telephone lines to attempt to establish a long distance telephone connection between said sensor station and central processing station; and means responsive to establishment of a long distance telephone connection between said sensor station and said central processing station for transmitting the temporarily stored code signals to said central processing station via said long distance public telephone lines.

17. The system according to claim 16 further comprising, at each sensor station, delay means for delaying automatic dialing for a predetermined period after received code signals are detected to permit code signals from other nearby vehicle emitters to be temporarily stored and transmitted to said central processing station during a common long distance connection.

18. The system according to claim 17 further comprising, at each sensor station, auxiliary means for temporarily storing code signals received from vehicles while a long distance transmission of previously-received code signals is in progress; wherein said means for automatically dialing is responsive to storage of code signals in said auxiliary means at the termination of a long distance call for automatically dialing said central processing station to establish a long distance connection therewith.

19. The system according to claim 16 wherein each emitter includes:

a plurality of oscillators for providing code tones;

actuable control means for switching the frequency of said oscillators between plural discrete frequencies;

timing means for defining plural successive time intervals;

transmitter means responsive to said timing means for combining and transmitting said code tones during at least a portion of each of said intervals; and means responsive to said timing means for actuating said control means to change the frequency of said oscillators in different intervals.

20. In a system for monitoring the location of movable objects relative to multiple prescribed locations:

an emitter carried by each movable object for automatically transmitting coded signals uniquely identifying that movable object, transmission from said emitters being at some nominal power level;

a plurality of satellite sensor stations, at least one at each of said prescribed locations, each satellite sensor station being arranged to receive signals from an emitter located within a predetermined distance from that satellite sensor station, said prescribed locations being spaced sufficiently to prevent the signal transmitted by an emitter at said nominal power level from being received at more than one satellite sensor station at a time;

a plurality of main sensor stations, each associated with a respective group of said satellite sensor stations;

radio transmitter means in each satellite sensor station for transmitting coded signals received by said satellite sensor station to the main sensor station associated therewith;

radio receiver means at each main sensor station for receiving coded signals transmitted from satellite sensor stations associated with that main sensor station;

a central processing station; and means at each main sensor station for automatically transferring coded signals received from said satellite sensor stations to said central processing station.

21. The system according to claim 20 wherein the last-mentioned means includes telephone lines.

22. The system according to claim 20 wherein the last-mentioned means comprises:

means responsive to reception of coded signals from said satellite sensor stations for automatically dialing said central processing station via public telephone lines to attempt to establish telephone contact between said main sensor station and said central processing station; and means responsive to establishment of said telephone contact for transmitting the coded signals received at said main sensor station to said central processing station.

* * * * *